(12) United States Patent
Osborne et al.

(10) Patent No.: US 10,181,767 B2
(45) Date of Patent: Jan. 15, 2019

(54) BRUSH ASSEMBLY WITH BRUSH CARD MOUNT WITH BRUSH HOLDERS HAVING BASE AND MAIN PORTION PIECES

(71) Applicant: Black & Decker Inc., Newark, DE (US)

(72) Inventors: Stephen P. Osborne, Pikesville, MD (US); Daniel F. Heck, Baltimore, MD (US); Colin M. Crosby, Baltimore, MD (US); Ryan F. Schroeder, Hampstead, MD (US); Barak N. Gohn, Shrewsbury, MD (US); William D. Spencer, Ellicott City, MD (US)

(73) Assignee: BLACK & DECKER INC., New Britain, CT (US)

( * ) Notice: Subject to any disclaimer, the term of this patent is extended or adjusted under 35 U.S.C. 154(b) by 1104 days.

(21) Appl. No.: 14/453,766

(22) Filed: Aug. 7, 2014

(65) Prior Publication Data

US 2015/0042203 A1     Feb. 12, 2015

Related U.S. Application Data

(60) Provisional application No. 61/864,264, filed on Aug. 9, 2013, provisional application No. 61/932,932, filed on Jan. 29, 2014.

(51) Int. Cl.
*H02K 13/00* (2006.01)
*H02K 7/14* (2006.01)
(Continued)

(52) U.S. Cl.
CPC .......... *H02K 7/145* (2013.01); *H01R 39/381* (2013.01); *H01R 39/385* (2013.01); *H02K 3/38* (2013.01);
(Continued)

(58) Field of Classification Search
CPC .......... H02K 7/145; H02K 7/085; H02K 5/14; H02K 5/143; H02K 5/148; H02K 5/18;
(Continued)

(56) References Cited

U.S. PATENT DOCUMENTS 1,686,324 A     10/1928   Hillix
1,858,870 A      5/1932   Apple
(Continued)

FOREIGN PATENT DOCUMENTS

DE    19522329    1/1997
EP     1621293    2/2006
(Continued)

OTHER PUBLICATIONS ip.com search, Aug. 16, 2017.*
(Continued)

*Primary Examiner* — Bernard Rojas
*Assistant Examiner* — Maged Almawri
(74) *Attorney, Agent, or Firm* — Amir Rohani

(57) ABSTRACT

An electric motor is provided including: a stator, an armature rotatably received within the stator and having an armature shaft on which a commutator is mounted, and a brush assembly. The brush assembly defines a first surface facing the stator and a second surface opposite the first surface. The brush assembly includes a brush card mount having openings, brushes in sliding contact with the commutator to supply electric current to the commutator, and thermally-conductive brush holders that house the brushes. Each of the brush holders includes a base portion disposed substantially along a same plane as a surface of the brush card mount to form the first surface of the brush assembly, and a main portion protruding from the base portion through a respective opening of the brush card mount to house a respective brush at least partially over the second surface of the brush assembly.

12 Claims, 28 Drawing Sheets

(51) Int. Cl.
  *H02K 5/14* (2006.01)
  *H02K 9/06* (2006.01)
  *H02K 13/10* (2006.01)
  *H02K 7/08* (2006.01)
  *H02K 9/04* (2006.01)
  *H01R 39/38* (2006.01)
  *H02K 9/28* (2006.01)
  *H02K 3/52* (2006.01)
  *H02K 3/38* (2006.01)
  *H02K 5/18* (2006.01)

(52) U.S. Cl.
  CPC ............ *H02K 3/527* (2013.01); *H02K 5/148* (2013.01); *H02K 7/085* (2013.01); *H02K 9/04* (2013.01); *H02K 9/06* (2013.01); *H02K 9/28* (2013.01); *H02K 13/00* (2013.01); *H02K 13/10* (2013.01); *H02K 5/18* (2013.01)

(58) Field of Classification Search
  CPC ...... H02K 13/00; H02K 13/006; H02K 13/10; H02K 9/04; H02K 9/06; H02K 9/28; H01R 39/38; H01R 39/381; H01R 39/383; H01R 39/385
  USPC .................................................. 310/239–249
  See application file for complete search history.

(56) References Cited

U.S. PATENT DOCUMENTS

| | | | |
|---|---|---|---|
| 2,406,389 A | 11/1942 | Lee | |
| 3,447,001 A | 5/1969 | Zelik | |
| 3,525,891 A | 8/1970 | Lukawich et al. | |
| 3,652,879 A | 3/1972 | Plunkett et al. | |
| 3,875,436 A | 4/1975 | MacFarland | |
| 4,074,162 A | 2/1978 | Parzych | |
| 4,115,030 A | 9/1978 | Inagaki et al. | |
| 4,184,804 A | 1/1980 | Inagaki et al. | |
| 4,276,737 A | 7/1981 | Henning | |
| 4,322,647 A * | 3/1982 | Neroda ................ H01R 4/2462 310/158 |
| 4,342,929 A | 8/1982 | Horne | |
| 4,403,910 A | 9/1983 | Watanabe et al. | |
| 4,491,752 A | 1/1985 | O'Hara et al. | |
| 4,498,230 A | 2/1985 | Harris et al. | |
| 4,504,754 A | 3/1985 | Stone | |
| 4,538,085 A | 8/1985 | Tanaka | |
| 4,593,220 A | 6/1986 | Cousins et al. | |
| 4,684,774 A | 8/1987 | Dibbnern, Jr. et al. | |
| 4,694,214 A | 9/1987 | Stewart et al. | |
| 4,734,604 A | 3/1988 | Sontheimer et al. | |
| 4,851,730 A * | 7/1989 | Fushiya ................ H02K 5/148 310/239 |
| 4,868,441 A * | 9/1989 | Bulick ................... H01R 39/40 310/239 |
| 5,021,696 A | 6/1991 | Nelson | |
| 5,049,770 A | 9/1991 | Gaeth et al. | |
| 5,055,728 A | 10/1991 | Looper et al. | |
| 5,089,735 A * | 2/1992 | Sawaguchi ............ H01R 39/40 277/621 |
| 5,264,749 A | 11/1993 | Maeda et al. | |
| 5,414,317 A | 5/1995 | Reid et al. | |
| 5,602,957 A | 2/1997 | Wille et al. | |
| 5,689,148 A | 11/1997 | Bubinchik | |
| 5,714,810 A | 2/1998 | Yuhi et al. | |
| 5,717,271 A | 2/1998 | Aoki et al. | |
| 5,729,064 A | 3/1998 | Noguchi et al. | |
| 5,773,907 A | 6/1998 | Bubinchik | |
| 5,810,111 A | 9/1998 | Takeuchi et al. | |
| 5,818,142 A | 10/1998 | Edlebute et al. | |
| 5,872,414 A | 2/1999 | Iijima | |
| 5,932,945 A | 8/1999 | Volz et al. | |
| 5,949,175 A | 9/1999 | Cummins | |
| 5,969,450 A | 10/1999 | Satterfield et al. | |
| 5,977,672 A | 11/1999 | Vacca | |
| 6,005,323 A | 12/1999 | Morimoto et al. | |
| 6,020,661 A | 2/2000 | Trago et al. | |
| 6,078,116 A | 6/2000 | Shiga et al. | |
| 6,087,758 A | 7/2000 | Hino et al. | |
| 6,124,567 A | 9/2000 | Feldhausen et al. | |
| 6,133,665 A * | 10/2000 | Prell ................. H01R 39/381 310/239 |
| 6,144,134 A * | 11/2000 | Lin ................... H01R 39/383 310/238 |
| 6,166,474 A | 12/2000 | Kohara et al. | |
| 6,288,469 B1 | 9/2001 | Kimura et al. | |
| 6,445,097 B1 | 9/2002 | Zeiler et al. | |
| 6,518,686 B2 | 2/2003 | Campbell et al. | |
| 6,528,910 B2 | 3/2003 | Nakamura et al. | |
| 6,528,921 B1 | 3/2003 | Nakane | |
| 6,541,890 B2 | 4/2003 | Murata et al. | |
| 6,552,465 B2 | 4/2003 | Mademba-Sy | |
| 6,555,943 B2 * | 4/2003 | Walther ................ H02K 5/148 310/239 |
| 6,677,693 B2 * | 1/2004 | Ooyama ............... H02K 5/148 310/233 |
| 6,701,604 B2 | 3/2004 | Zeiler et al. | |
| 6,703,754 B1 | 3/2004 | Finkenbinder et al. | |
| 6,707,177 B1 | 3/2004 | Campbell et al. | |
| 6,707,181 B1 | 3/2004 | Militello et al. | |
| 6,713,916 B1 | 3/2004 | Williams et al. | |
| 6,842,966 B1 | 1/2005 | Campbell et al. | |
| 6,870,296 B2 | 3/2005 | Ho et al. | |
| 6,880,231 B2 | 4/2005 | Campbell et al. | |
| 6,909,218 B2 * | 6/2005 | Ortt ..................... H01R 39/385 310/239 |
| 6,922,003 B2 * | 7/2005 | Uchida ................. H01R 39/59 310/239 |
| 6,927,512 B2 | 8/2005 | Zeiler et al. | |
| 6,977,452 B2 | 12/2005 | Ibach | |
| 7,064,462 B2 | 6/2006 | Hempe et al. | |
| 7,132,777 B2 | 11/2006 | Finkenbinder et al. | |
| 7,157,828 B2 | 1/2007 | Moroto et al. | |
| 7,166,939 B2 | 1/2007 | Voigt et al. | |
| 7,173,359 B2 | 2/2007 | Kong et al. | |
| 7,256,527 B2 | 8/2007 | Niimi | |
| 7,414,346 B1 * | 8/2008 | Henmi ................. H01R 39/36 310/239 |
| 7,459,819 B2 | 12/2008 | Finkenbinder et al. | |
| 7,466,056 B2 | 12/2008 | Golab et al. | |
| 7,495,367 B2 | 2/2009 | Braml et al. | |
| 7,521,826 B2 | 4/2009 | Hempe et al. | |
| 7,567,007 B2 | 7/2009 | Furui et al. | |
| 7,652,402 B2 | 1/2010 | Kinoshita et al. | |
| 7,683,519 B2 | 3/2010 | Finkenbinder et al. | |
| 7,777,380 B2 | 8/2010 | Rogelein | |
| 7,859,145 B2 | 12/2010 | Rapp et al. | |
| 7,944,112 B2 | 5/2011 | Kim et al. | |
| 7,952,241 B2 | 5/2011 | Kato et al. | |
| 7,977,835 B2 | 7/2011 | Simofi-Ilyes et al. | |
| 7,988,538 B2 | 8/2011 | Trautner et al. | |
| 8,049,380 B2 | 11/2011 | Li et al. | |
| 8,049,391 B2 | 11/2011 | Lau et al. | |
| 8,063,532 B2 | 11/2011 | Ahn | |
| 8,096,043 B2 | 1/2012 | Hargraves et al. | |
| 8,141,231 B2 | 3/2012 | Wolfe, Jr. et al. | |
| 8,154,169 B2 | 4/2012 | Qin et al. | |
| 8,294,328 B2 | 10/2012 | Lau et al. | |
| 8,723,389 B2 * | 5/2014 | Shim .................... H02K 5/148 310/239 |
| 9,083,131 B2 | 7/2015 | Shima et al. | |
| 9,722,470 B2 * | 8/2017 | Honda ................... H02K 5/225 |
| 2003/0111929 A1 | 6/2003 | Hong et al. | |
| 2003/0111930 A1 * | 6/2003 | Vacheron ............ H01R 39/385 310/239 |
| 2004/0000835 A1 | 1/2004 | Fujita et al. | |
| 2004/0027028 A1 | 2/2004 | Ho et al. | |
| 2004/0171299 A1 * | 9/2004 | Zeiler .................... B25F 5/02 439/577 |
| 2004/0245886 A1 * | 12/2004 | Uchida ................. H01R 39/59 310/239 |
| 2005/0134126 A1 | 6/2005 | Ibach | |

(56) References Cited

U.S. PATENT DOCUMENTS

| | | |
|---|---|---|
| 2005/0196273 A1 | 9/2005 | Nishikawa et al. |
| 2006/0028088 A1 | 2/2006 | McFarland et al. |
| 2006/0290213 A1 | 12/2006 | Furui et al. |
| 2007/0007846 A1* | 1/2007 | Niimi ............... H01R 39/385 310/239 |
| 2007/0126311 A1* | 6/2007 | Acosta ............... H01R 39/381 310/239 |
| 2007/0241631 A1* | 10/2007 | Lamprecht ........... H01R 39/385 310/239 |
| 2008/0084133 A1 | 4/2008 | Burton et al. |
| 2009/0115266 A1* | 5/2009 | Hatfield ............... H01R 39/385 310/50 |
| 2009/0121579 A1 | 5/2009 | Finkenbinder et al. |
| 2009/0322166 A1 | 12/2009 | Satterfield et al. |
| 2010/0045136 A1 | 2/2010 | Lau et al. |
| 2011/0200466 A1 | 8/2011 | VanBriston et al. |
| 2013/0049523 A1 | 2/2013 | Shima et al. |

FOREIGN PATENT DOCUMENTS

| | | |
|---|---|---|
| EP | 1763123 | 3/2007 |
| EP | 2197076 | 6/2010 |
| FR | 2932318 | 12/2009 |
| JP | S61106041 | 5/1986 |
| JP | S6441689 | 3/1989 |
| JP | H09261914 | 10/1997 |
| JP | H1056761 | 2/1998 |
| JP | 2004249425 | 9/2004 |
| JP | 2008172943 | 7/2008 |
| JP | 2009284638 | 12/2009 |

OTHER PUBLICATIONS

EP search report dated Jan. 7, 2016 for EP Application No. 14180418.7.
EP search report dated Jan. 7, 2016 for EP Application No. 14180371.8.
EP search report dated Jan. 7, 2016 for EP Application No. 14180413.8.
EP search report dated Nov. 16, 2015 for EP Application No. 14180375.9.
EP search report dated Jan. 7, 2016 for EP Application No. 14180417.9.
EP search report dated Apr. 4, 2016 for EP Application No. 14180385.8.
EP search report dated Jan. 7, 2016 for EP Application No. 15193679.6.
EP Office Action dated Oct. 27, 2017 issued in corresponding EP patent application No. 14180417.9.
Non Final Office Action dated Jul. 27, 2017 issued in corresponding U.S. Appl. No. 14/453,706.
EP Office Action dated Oct. 27, 2017 issued in corresponding EP patent application No. 14180413.8.
Non Final Office Action dated Aug. 17, 2017 issued in corresponding U.S. Appl. No. 14/453,766.
Non Final Office Action dated Aug. 25, 2017 issued in corresponding U.S. Appl. No. 14/453,755.
EP Office Action dated Aug. 17 2017 issued in corresponding EP patent application No. 14180371.8.
Non Final Office Action dated Jun. 19, 2017 issued in corresponding U.S. Appl. No. 14/453,785.
Non Final Office Action dated May 4, 2017 issued in corresponding U.S. Appl. No. 14/453,793.
Notice of Allowance dated Sep. 6, 2017 issued in corresponding U.S. Appl. No. 14/608,917.
Non Final Office Action dated May 17, 2017 issued in corresponding U.S. Appl. No. 14/608,917.
Non Final Office Action dated May 5, 2017 issued in corresponding U.S. Appl. No. 14/453,873.
Non Final Office Action dated Sep. 6, 2017 issued in corresponding U.S. Appl. No. 14/935,560.
Non Final Office Action dated Apr. 18, 2017 issued in corresponding U.S. Appl. No. 14/453,863.
EP Office Action dated Aug. 31, 2017 issued in corresponding EP Application No. 14 180 418.7.

* cited by examiner

BRUSH ASSEMBLY WITH BRUSH CARD MOUNT WITH BRUSH HOLDERS HAVING BASE AND MAIN PORTION PIECES

CROSS-REFERENCE TO RELATED APPLICATIONS

This utility application claims the benefit of U.S. Provisional Application No. 61/864,264 filed Aug. 9, 2013, and U.S. Provisional Application No. 61/932,932 filed Jan. 29, 2014, contents of both of which are incorporated herein by reference in their entirety.

FIELD OF THE DISCLOSURE

The present disclosure relates to a brush assembly for electric motors, and more particularly to a brush assembly for motors used in electric power tools.

BACKGROUND

The statements in this section merely provide background information related to the present disclosure and may not constitute prior art.

Known portable power tools typically have an electric motor received within a tool housing. One common type of electric motor used in power tools has a rotor, a stator, and brushes. The rotor includes a rotor shaft, laminations mounted on the rotor shaft, armature windings wound in slots in the lamination stack, and a commutator mounted on the rotor shaft and electrically connected to the armature windings. The stator may have field windings wound in laminations, or may have permanent magnets. The brushes are mounted in brush housings, often known as brush boxes or brush holders, in sliding electrical contact with the commutator. Electric current is supplied from a power source through the brushes to the commutator, and from the commutator to the armature windings.

The brushes and brush holders are typically part of a brush assembly(ies). The brush holders and brushes are disposed diametrically opposite to each other with the commutator disposed therebetween. The brush assembly(ies) includes springs that urge the brushes against the commutator. Exemplary brush assemblies may utilize two or four brushes around the commutator.

Generally, in brush assemblies, transmission of electric current across the sliding interface between the brushes and the motor commutator generates a considerable amount of heat. This heat is often associated with the material used in the brushes. Such materials have relatively higher electrical resistance in order to enhance desirable brush properties such as low friction coefficient and high durability. The heat is also generated from the electrical arcing that occurs when electrical switching occurs as the commutator and brushes rotate with respect to each other. It is desirable for this heat to be transferred away from the brushes and dissipated, for example by impinging air flow.

Conventional brush holder designs often include a brush card mount that is made of a plastic material and the brush holders mounted on a top surface of the brush card mount. The plastic brush card mount separates the brush holders and the brushes from the rest of the motor, where a cooling fan is usually disposed to cool the motor stator and armature. This results in a high thermal coefficient between the brushes and the cooling air, which correspondingly results in high temperatures. Some conventional designs utilize larger brushes or larger air flow paths to increase the surface area of the brushes or brush holders in the path of the airflow, but such designs result in larger and more expensive motors.

Another disadvantage of above-described conventional designs is the mechanical mounting and assembly of the brush holders over the brush card mount. In these designs, the brush holders are mounted on the top surface of the brush assembly, and crimp connections are generally used to secure the brush holders to the brush card mount. These crimp connections provide added tolerances that add to the overall size of the motor assembly. In particular, in designs where a motor fan is provided adjacent the brush assembly, the distance between the fan and the brush assembly must be increased to account for the added tolerances of the crimp connections.

What is needed is a brush assembly design that enables more efficient heat transfer from the brushes and brush holders. Also needed is a brush assembly design that reduces the tolerances associated with the conventional brush holder mounting methods.

SUMMARY

According to an embodiment of the invention, an electric motor is provided including: a stator, an armature rotatably received within the stator and having an armature shaft on which a commutator is mounted, and a brush assembly. In an embodiment, the brush assembly defines a first surface facing the stator and a second surface opposite the first surface. In an embodiment, the brush assembly includes a brush card mount having openings, brushes in sliding contact with the commutator to supply electric current to the commutator, and thermally-conductive brush holders that house the brushes. In an embodiment, each of the brush holders include a base portion disposed substantially along a same plane as a surface of the brush card mount to form the first surface of the brush assembly, and a main portion protruding from the base portion through a respective opening of the brush card mount to house a respective brush at least partially over the second surface of the brush assembly.

In an embodiment, the base piece is provided as a separate piece from the main piece. In an embodiment, the base piece includes a flat portion, and the main piece includes a brush-holder portion shaped to contain three sides of the brush and two flat portions extending from the ends of the brush-holder portion in parallel to the base piece. In an embodiment, flat portions of the brush-holder portion are mounted on the base piece and the flat portion of the base piece contains a fourth side of the brush. In an embodiment, the brush-holder portion of main piece is received through the opening of the brush card mount from the first surface and the flat portions of the main piece are sandwiched between the brush card mount and the base piece.

In an embodiment, the base piece further includes a plurality of legs projecting substantially perpendicularly therefrom. In an embodiment, two flat portions of the main piece include slots corresponding to the legs of the base piece, and the brush card mount also includes slots corresponding to the slots of the main piece and the legs of the base piece. In an embodiment, the legs of the base piece are received through the slots of the brush card mount and slots of the main piece and crimped over the brush card mount within the second surface of the brush assembly to securely hold the brush holder to the brush card mount.

In an embodiment, the brush card mount includes recessed pockets within the second surface and around the slots of the brush card mount, and crimped portions of the legs of the base piece engage the recessed pockets.

In an embodiment, the base piece and the main piece include engaging features for proper alignment of the base piece and the main piece.

In an embodiment, the brush card mount includes recessed surfaces around the openings within the first surface of the brush assembly and the base portions of the brush holders are disposed within the respective recessed surfaces.

In an embodiment, the brush card mount further includes a planar portion disposed around the commutator, a bridge portion disposed at an end of the commutator and extending from the planer portion via legs; and at least one metal routing disposed on the bridge portion to connect the brushes.

In an embodiment, the brush assembly includes upright posts disposed in close proximity to the plurality of openings on the second surface of the brush card mount, and a torsion springs disposed around the upright posts and engaging ends of the brushes.

In an embodiment, there are at least four brushes arranged equidistantly on four sides of the brush assembly.

According to an embodiment of the invention, a power tool is provided including a housing and an electric motor disposed within the housing. In an embodiment, the motor includes a stator, an armature rotatably received within the stator and having an armature shaft on which a commutator is mounted, and a brush assembly. In an embodiment, the brush assembly defines a first surface facing the stator and a second surface opposite the first surface. In an embodiment, the brush assembly includes a brush card mount having openings, brushes in sliding contact with the commutator to supply electric current to the commutator, and thermally-conductive brush holders that house the brushes. In an embodiment, each of the brush holders include a base portion disposed substantially along a same plane as a surface of the brush card mount to form the first surface of the brush assembly, and a main portion protruding from the base portion through a respective opening of the brush card mount to house a respective brush at least partially over the second surface of the brush assembly.

The above-described embodiments substantially improve heat transfer from the brushes and brush holders by providing metallic heat sinks on the first surface of the brush assembly on the path of air flow from the motor fan. This arrangement thus improves heat transfer from the brushes. Furthermore, as the brush holders are mounted through the first surface of the brush assembly facing the stator (and the fan) and crimped onto the second surface of the brush assembly, tolerances associated with the crimp connections are reduced and/or eliminated.

DETAILED DESCRIPTION

Reference will now be made in detail to various aspects and embodiments of the invention, examples of which are illustrated in the accompanying drawings.

Four-Pole Brush Card with Bridge Connector

Figure 1A:
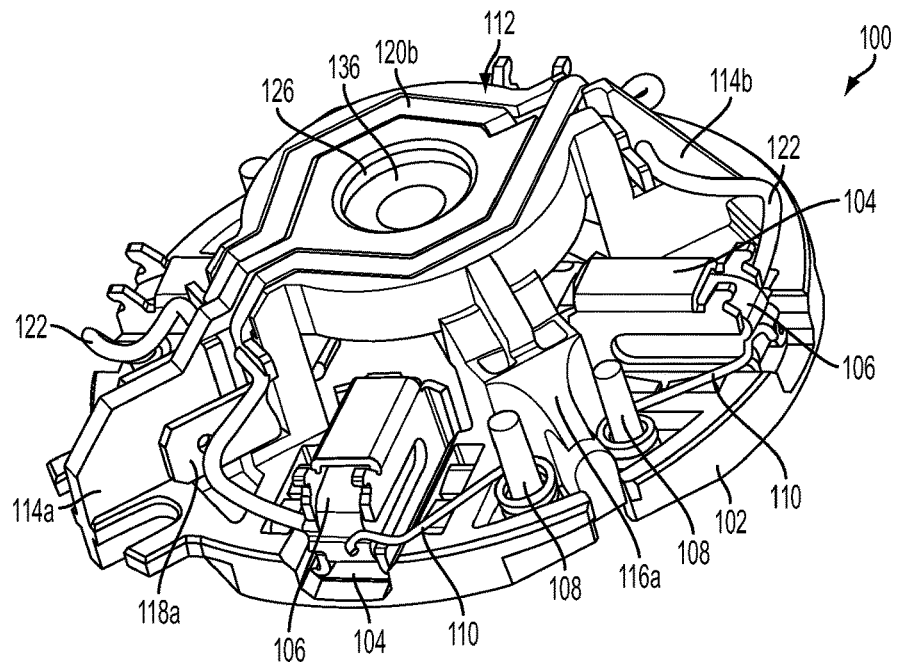
FIGS. 1A and 1B depict perspective side views of a four-pole brush assembly (also referred to herein as brush card) 100, according to an embodiment.
Figure 1B:
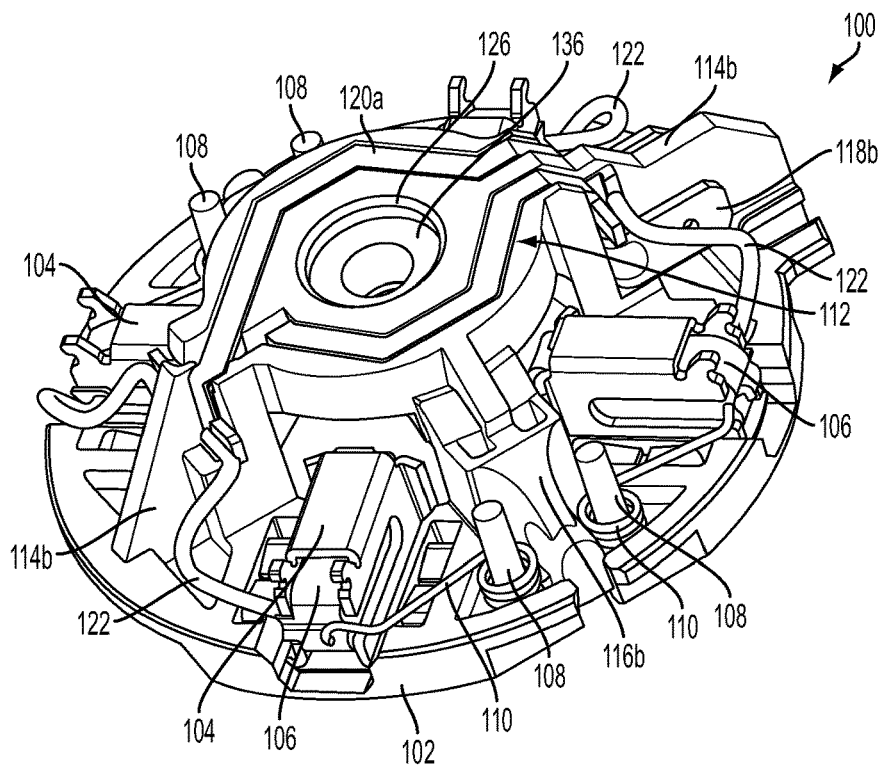
Figure 2:
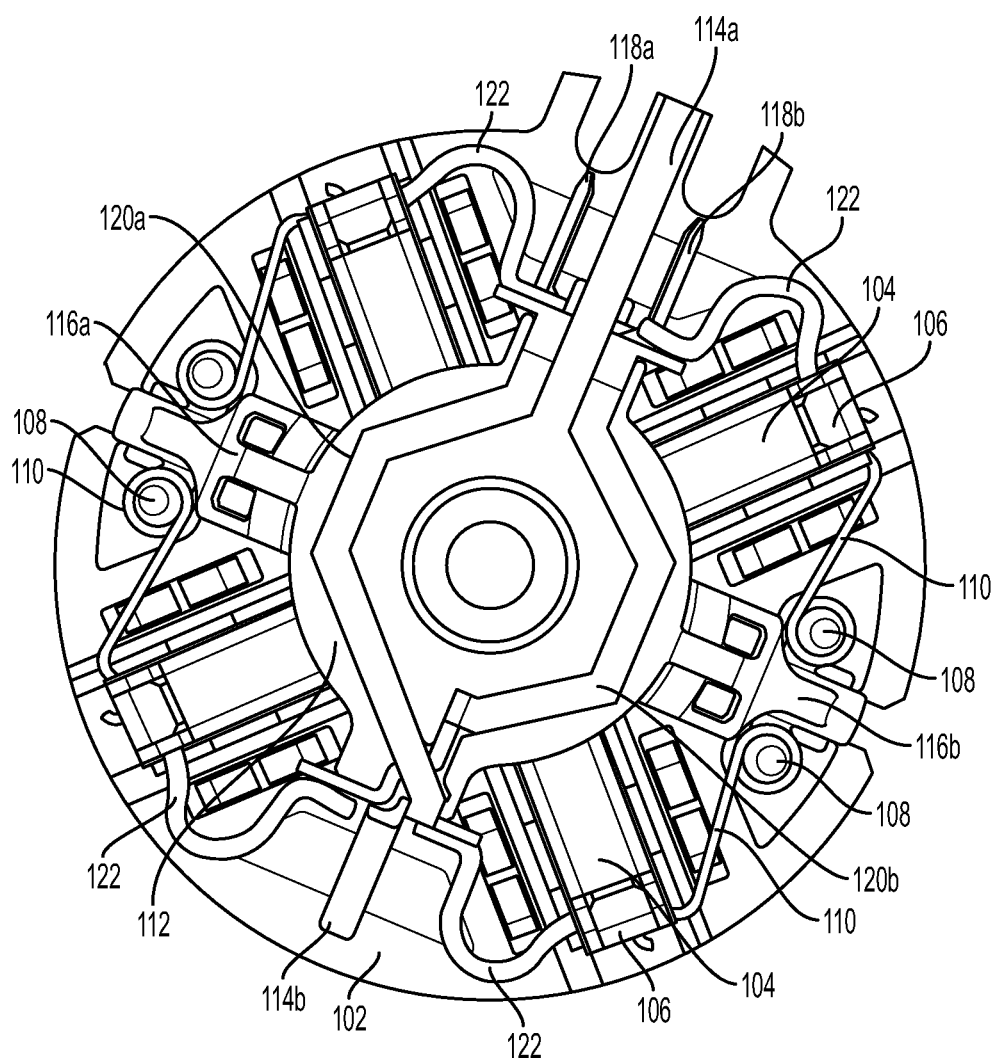
FIGS. 2 and 3 respectively depict top and bottom views of the four-pole brush card 100, according to an embodiment.
Figure 3:
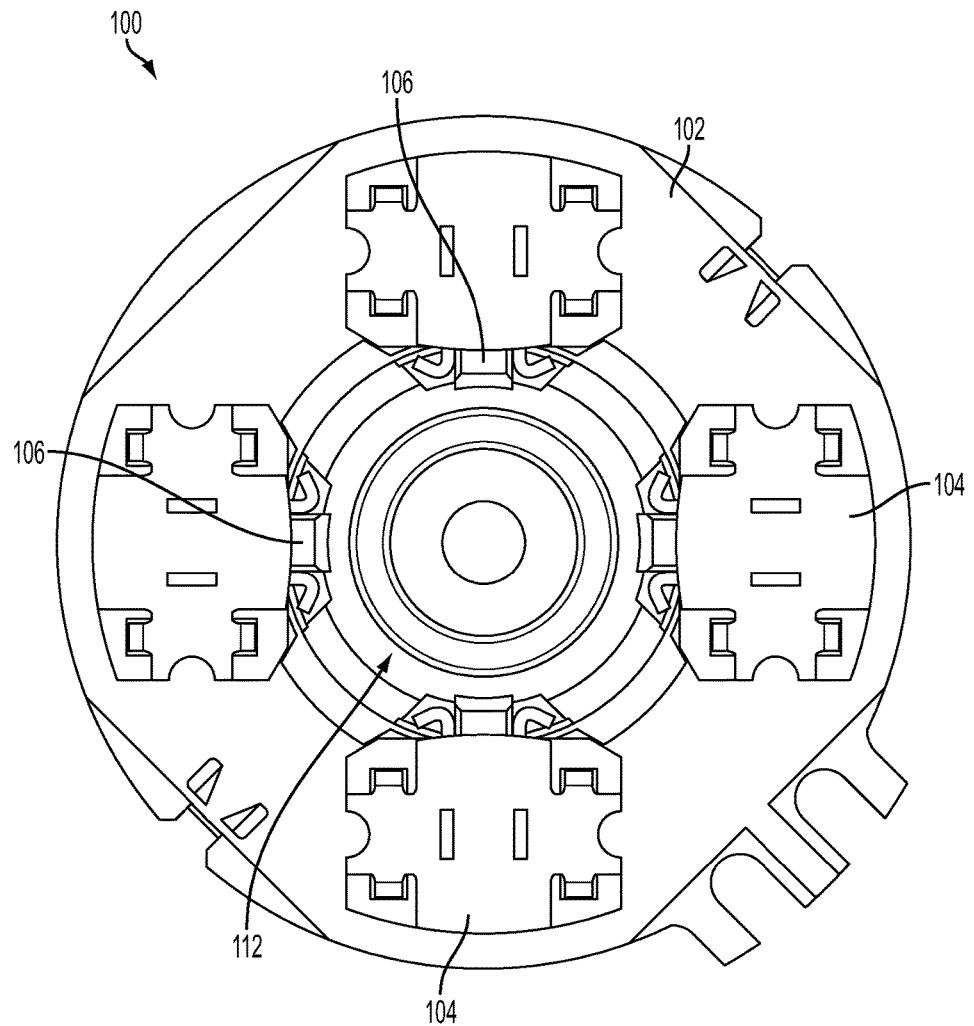

A first aspect of the invention is discussed herein. FIGS. 1A and 1B depict perspective side views of a four-pole brush assembly (also referred to herein as brush card) 100, according to an embodiment of the invention. FIGS. 2 and 3 respectively depict top and bottom views of the four-pole brush card 100, according to an embodiment. In this embodiment, brush card 100 includes a brush card mount 102 and four brush holders 104. The brush card mount 102 has a substantially circular circumference and the four brush holders 104 are arranged equidistantly on four sides of the brush card mount 102. Each brush holder 104 accommodates a brush 106 therein. The brushes 106 housed in brush holders 104 facing each other are electrically connected to one another, as discussed below. Both ends of each brush holder 104 are open to allow radial movement of the brush 106 towards and away from a center of the brush card 100. The brush card mount 102 includes upright posts 108 in close proximity to the brush holders 104. Each post 108 is arranged to hold a wound portion of a spring 110. Each spring 110 includes an extended arm that engages a back surface of brush 106 inside the brush holder 104 to bias the brush 106 towards the center of the brush card 100.

According to an embodiment, brush card mount 102 includes a planar portion, to which brush holders 104 are secured. A middle section of the planar portion includes an opening that receives a motor commutator (not shown). The brush card mount 102 also includes a bridge portion 112 arranged above the commutator opening (and the commutator) and connected to the planar portion via four bridge legs 114a, 114b, 116a, and 116b. Bridge legs 114a, 114b, 116a, and 116b extend longitudinally (i.e., in the direction of the motor, at a substantially right angle with respect to the plane of the brush card mount 102) from the planar portion to the bridge portion through the grooves 238. The pins 228 securely hold the shaft bearing 236 inside the pocket 226.

In an alternative embodiment, instead of using two pins 226 as shown herein, any retention mechanism, e.g., an E-clip, a C-clip, a single piece U-shaped retainer, a split ring, etc., may be used to retain the shaft bearing 236.

Bottom-Mount Brush Holder

Figure 8:
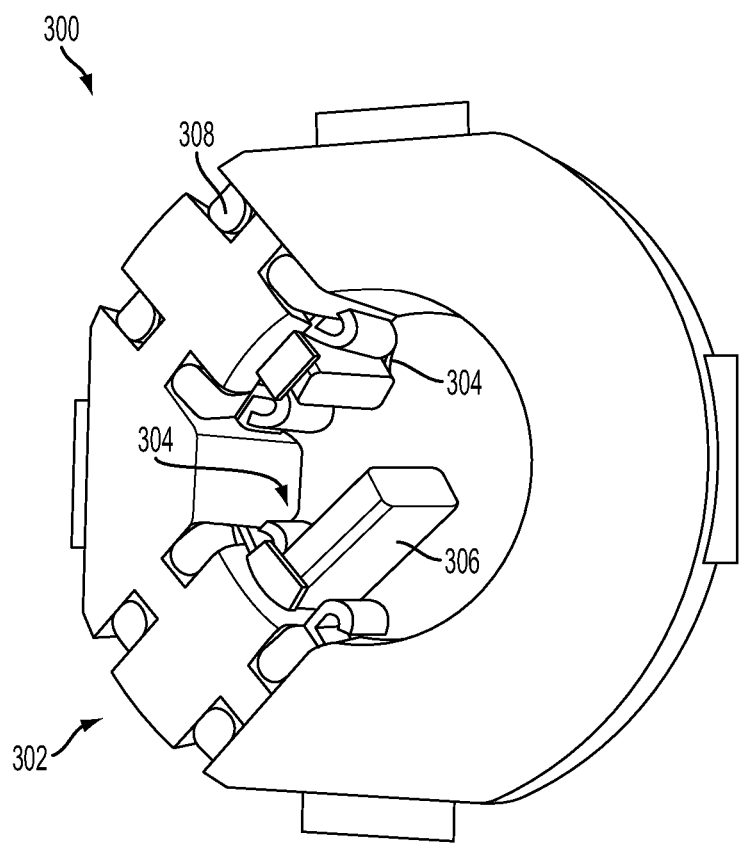
FIG. 8 depicts a rear perspective view of a conventional brush assembly 300 including a brush card mount 302, brush holders 304, and brushes 306, according to an embodiment.

Another aspect of the invention is discussed herein with reference to FIGS. 8-14B. FIG. 8 depicts a rear perspective view of a conventional brush assembly 300 including a brush card mount 302, brush holders 304, and brushes 306. Brush holders 304 are mounted on a top surface of the brush card mount 302. Brush holders 304 include legs 308 that penetrate through openings, or around the edges of the brush card mount 302 and crimp on the rear side of the brush card mount 302. Brush holders 304 may be provided as single piece or multi-piece units.

In four-pole motor platforms, particularly in the context of power tool designs, the brush card 300 is arranged around a motor commutator, with the rear surface of the brush card 300 facing the motor stator and fan. The top surface of the brush card 300 (i.e., where the brush holders 304 are located) is arranged and at end of the power tool in the proximity of air inlets. Brush holders 304 generate a substantial amount of heat resulting from the electrical current passing through the brushes 306. As the fan spins, air is sucked through the air inlets. Air flows around the brush holders 304, through the opening in the brush card 300 and around the outer circumference of the brush card 300, into the fan. While the air flow cools the brush holders 304 to some degree, the cooling effect of the air flow in this conventional design is not sufficient in many power tool designs, in particular in high power applications. What is needed is a more effective cooling mechanism for the brush assembly.

Figure 9A:
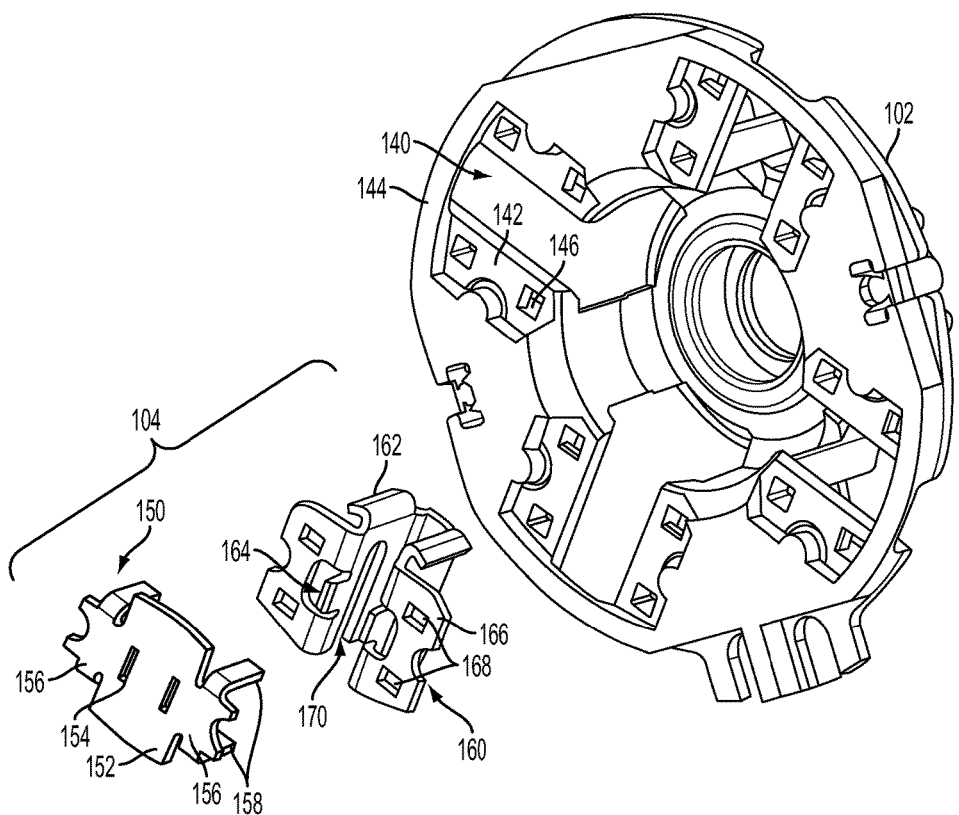
FIGS. 9A-9C depict various expanded and assembled views of a brush holder 104 and a brush card mount 102, according to an embodiment.
Figure 9B:
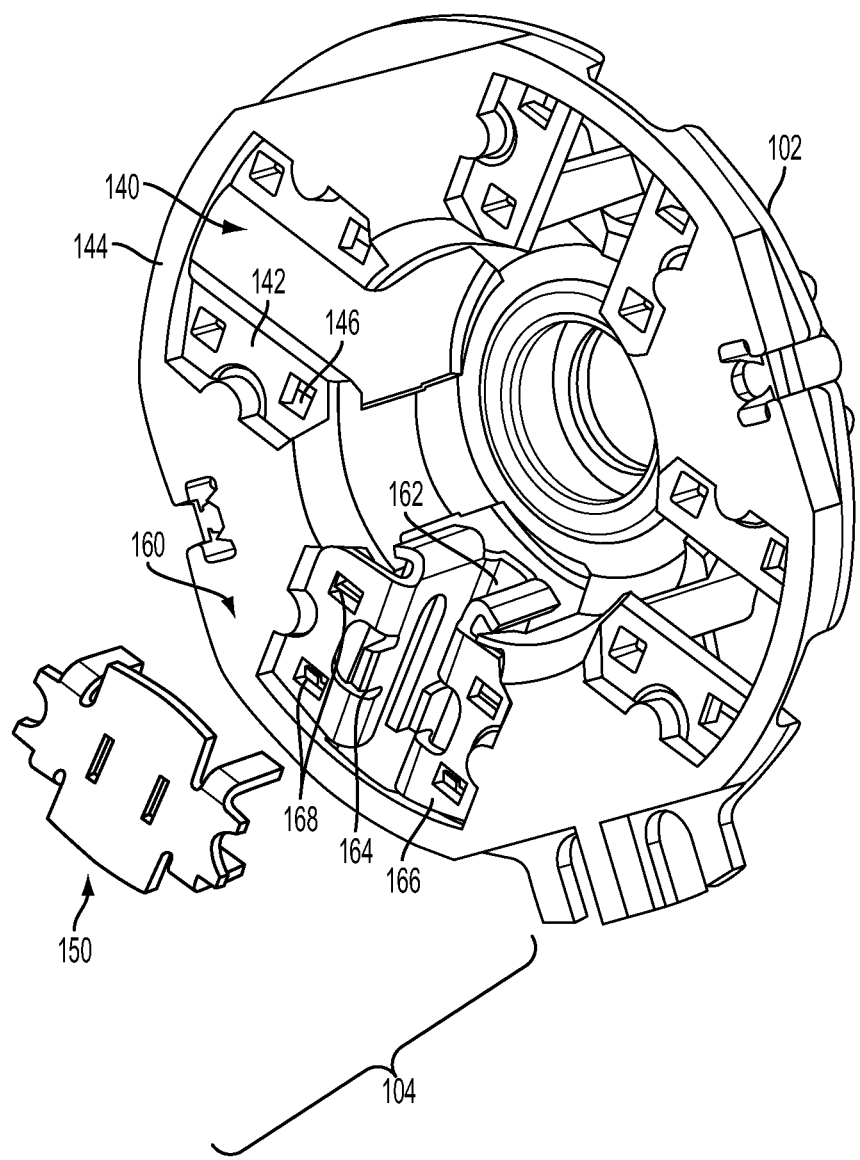
Figure 9C:
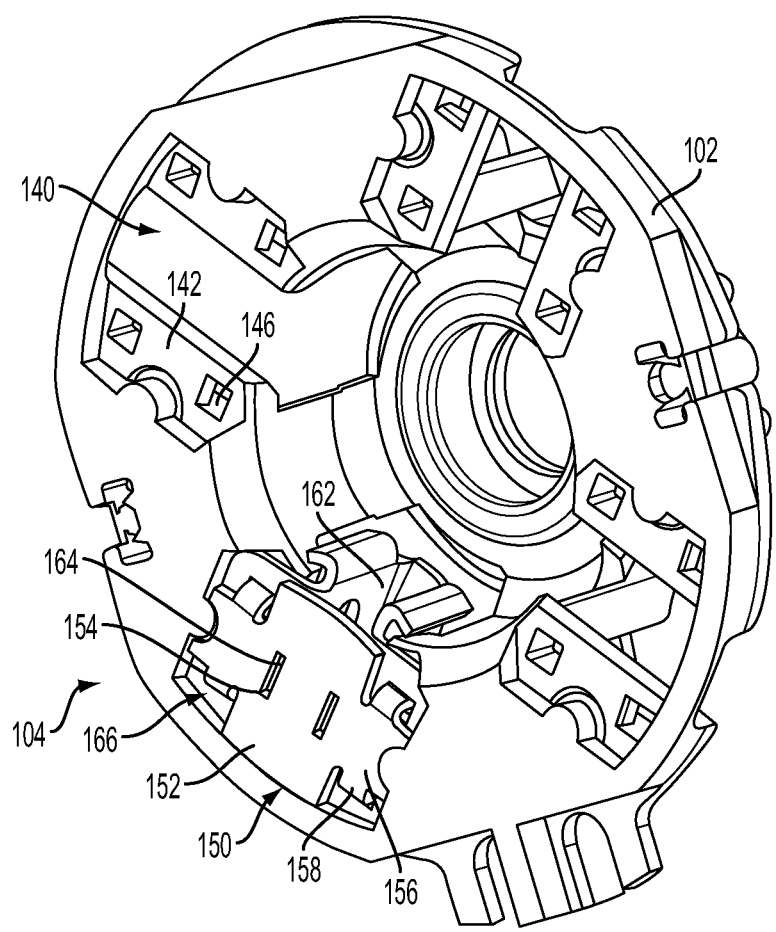

According to an embodiment of the invention, as shown in FIGS. 9A-9C, a new brush holder/brush card design is provided. In an embodiment, brush card mount 102 includes four openings 140 for receiving the brush holders 104 through its rear surface. This results in brush holders 104 occupying a large portion of the surface area of the rear surface of the brush card 100 adjacent the motor fan. Thus, in an embodiment, brush holders 104 act as heat sinks to transfer heat away from the brush card 100. This design significantly improves heat transfer as compared to the conventional design discussed above.

According to an embodiment, each opening 140 of the brush card mount 102, as viewed from the rear surface of the brush holder 104, is defined by two recessed surfaces 142 of the brush card mount 102 on its sides and a boundary portion 144 of the brush card mount 102 on its radial end. The recessed surfaces 142 each include two slots 146.

As shown in the expanded view of FIG. 9A, the brush holders 104 (only one of which is shown herein) each include a base piece 150 and a main piece 160, according to an embodiment. The base piece 150 in this embodiment includes a flat portion 152 and two side portions 156. Flat portion 152 includes two rectangular slots 154. Side portions 156 each include two upwardly-projecting legs 158.

The main piece 160, in an embodiment, includes a brush-holder portion 162 that is shaped to contain two side surfaces and a top surface of the brush 106. Extending from side ends the brush-holder portion 162 are two flat portions 166 that extend parallel with the rear surface of the brush card mount 102. The flat portions 166 each include two slots 168 that correspond to and receive upwardly-projecting legs 158 of the base piece 150. In addition, the brush-holder portion 162 includes two downward protrusions 164 that correspond to and are received inside rectangular slots 154 of the base piece 150. The side surfaces of the brush-holder portion 162, in an embodiment, include openings 170 that is open-ended on a distal end of the brush holder 104 and extends radially to accommodate the back and forth movement of the spring 110 and the wires 122.

FIGS. 9B and 9C depict steps of assembling the brush holder 104 into the brush card mount 102, according to an embodiment of the invention. As shown in FIG. 9B, the main piece 160 of the brush holder 104 is inserted into the opening 140 of the brush card mount 102. The top surfaces of the flat portions 166 mate with the recessed surfaces 142 of the bush card 102 around the opening 140. The brush holder portion 162 penetrates through the opening 140 and projects above the top surface of the brush card mount 102. Slots 168 of the main piece 160 in this position are aligned with slots 146 of the recessed surfaces 142.

Next, as shown in FIG. 9C, upwardly-projecting legs 158 of the base piece 150 are inserted through the aligned slots 168 of the main piece 160 and slots 146 of the recessed surfaces 142. Downward protrusions 164 are received inside the rectangular slots 154 as the base piece 150 comes in contact with the main piece 160. Side portions 156 of the base piece 150 mate with the back surfaces of the flat portions 166 of the main piece 160. Once this step is complete, the upwardly-projecting legs 158 are crimped as discussed below. The flat portion 152 of the base piece 150, together with the brush holder portion 162, form a rectangular box for holding the brush 106.

Figure 4:
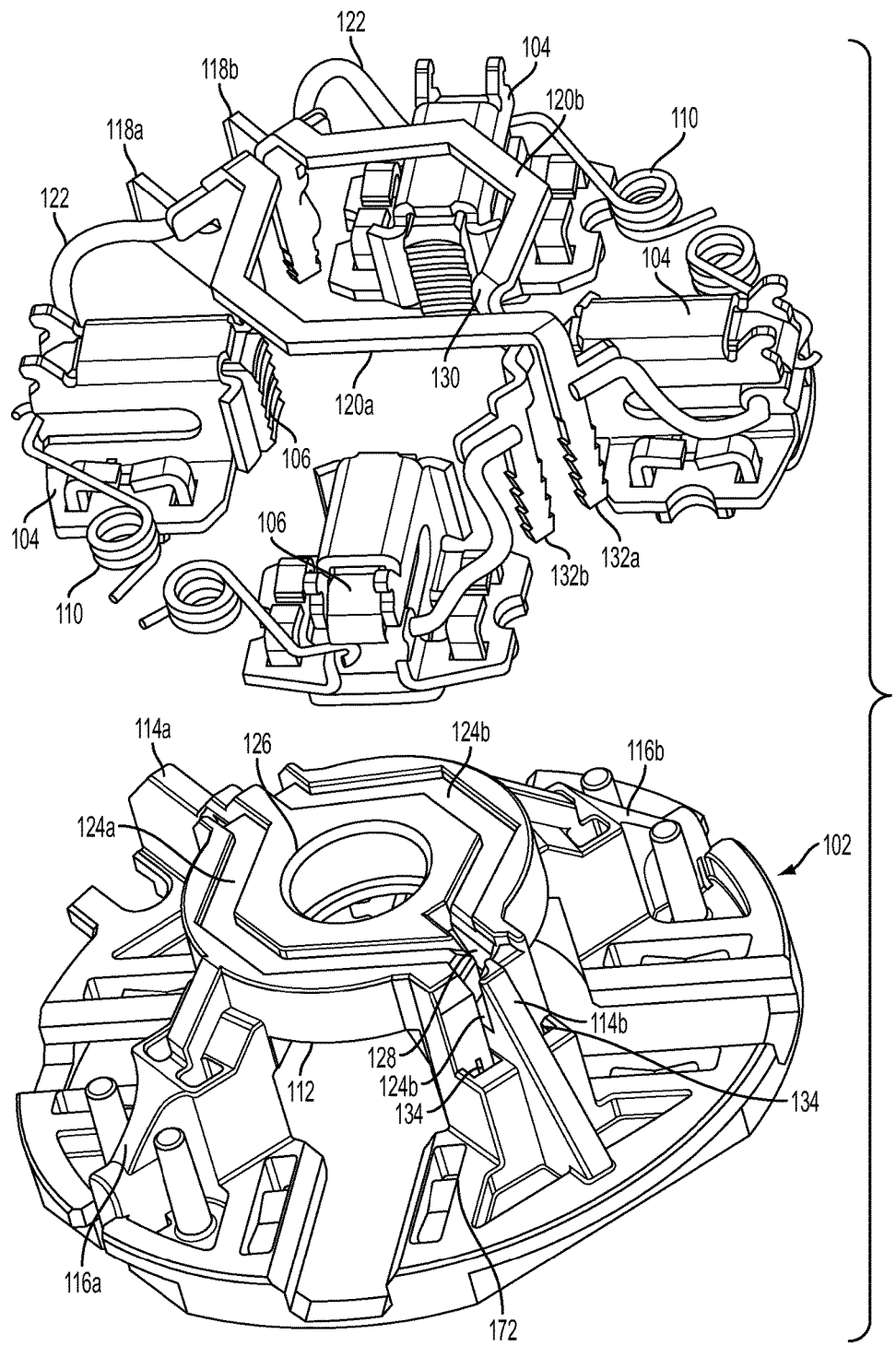
FIG. 4 depicts a perspective expanded view of brush card 100, according to an embodiment.
Figure 5:
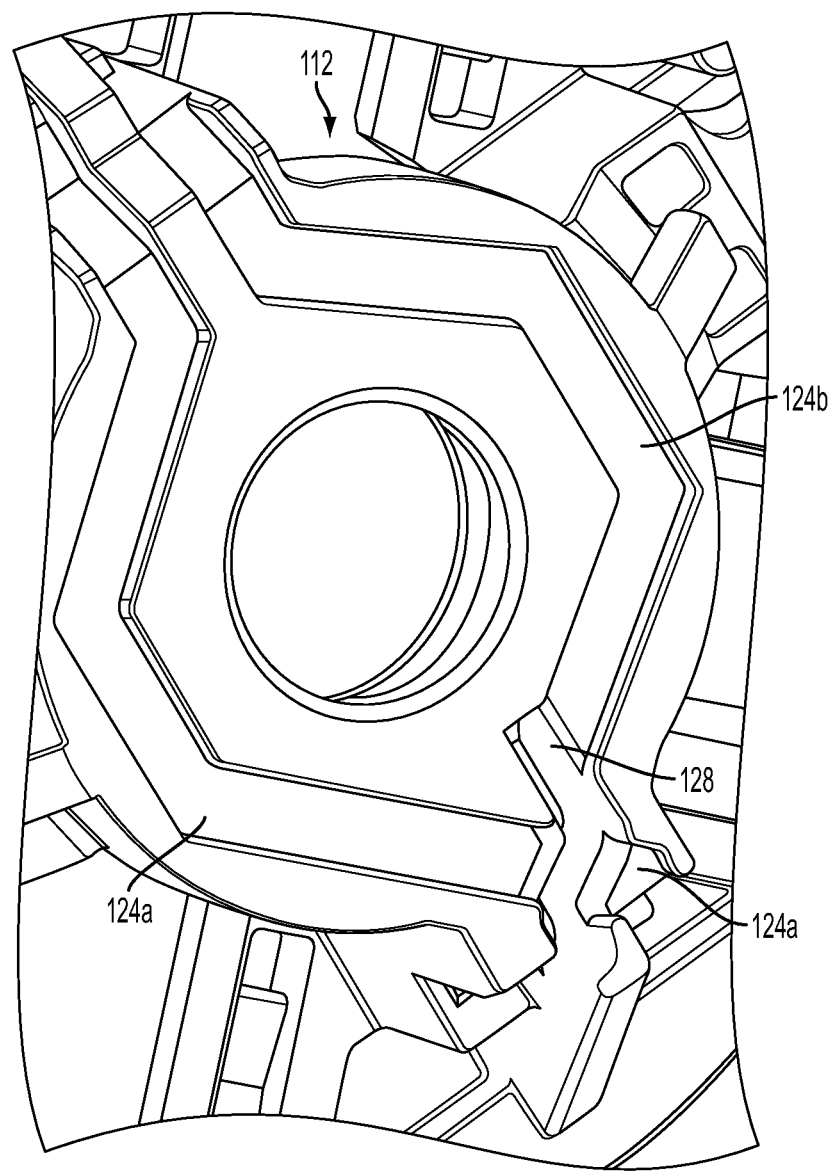
FIG. 5 depicts a zoomed-in view of the bridge portion 112 showing the channels 124a and 124b and the vertical drop 128 within the channel 124b, according to an embodiment.
Figure 6A:
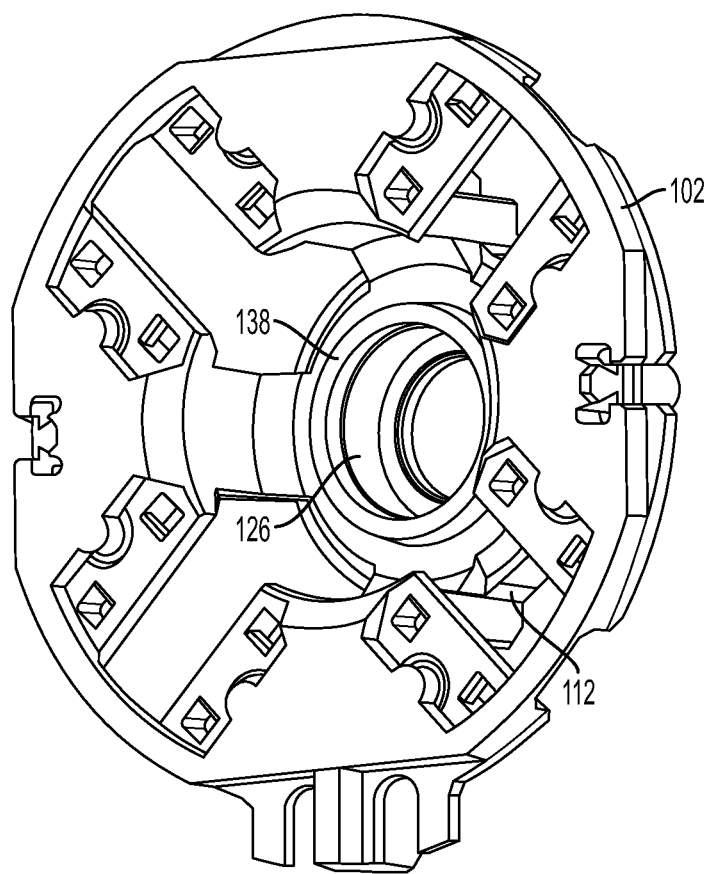
FIG. 6A depicts a rear perspective view of the brush card mount 102 prior to the bearing 136 being inserted and heat-staked, according to an embodiment.
Figure 6B:
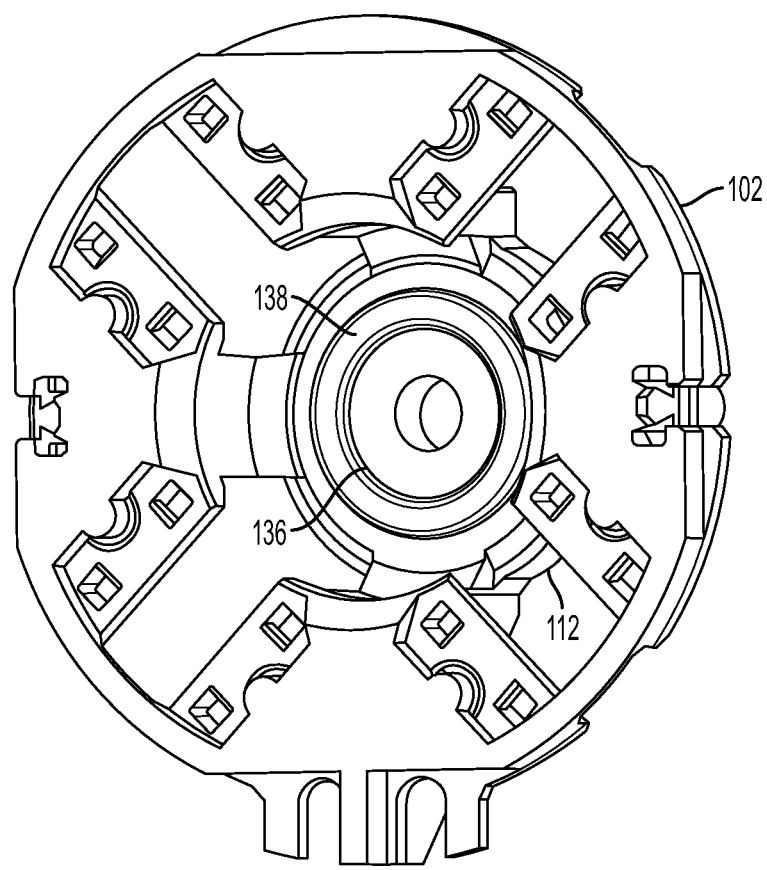
FIG. 6B depicts a rear perspective view of the brush card mount 102 after the bearing 136 is inserted into the bearing pocket 126 and heat-staked, according to an embodiment.
Figure 7A:
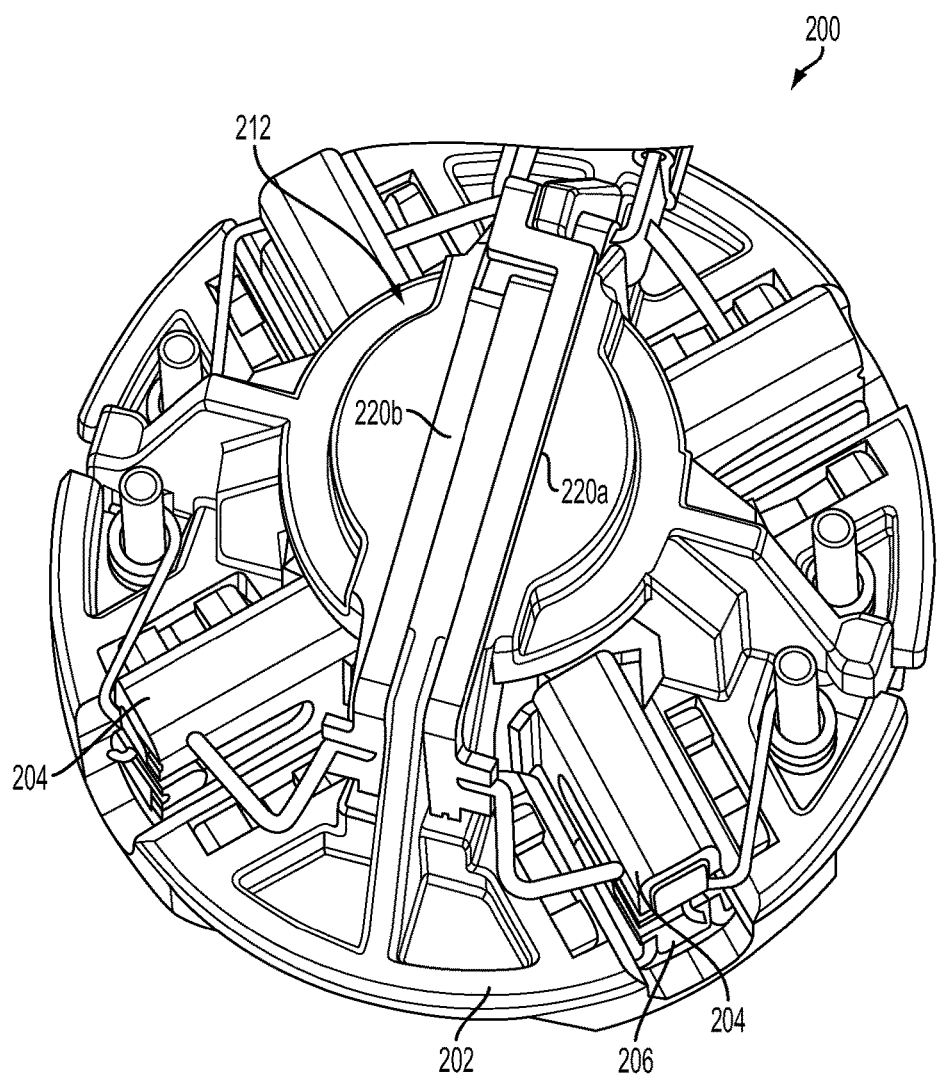
FIG. 7A depicts a front perspective view of a four-pole brush card 200, according to an alternative embodiment.
Figure 7B:
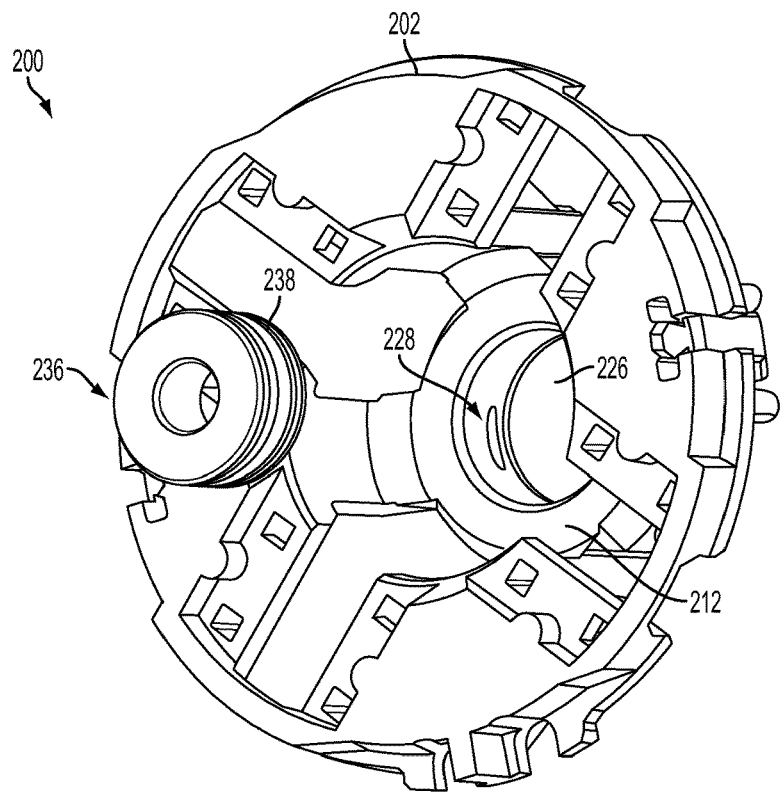
FIG. 7B depicts a rear perspective view of the brush card mount 202 of the brush card 200, according to an embodiment.
Figure 7C:
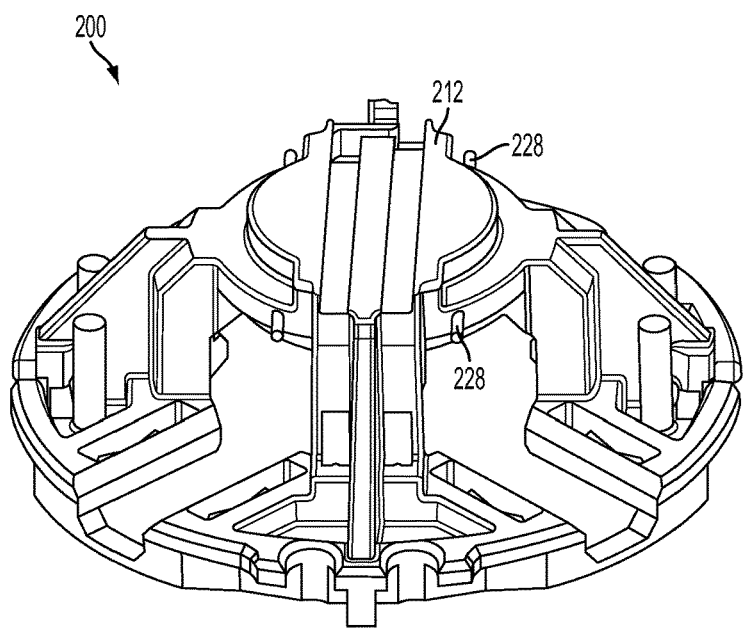
FIG. 7C depicts a perspective view of the brush card mount 202, according to an embodiment.
Figure 10:
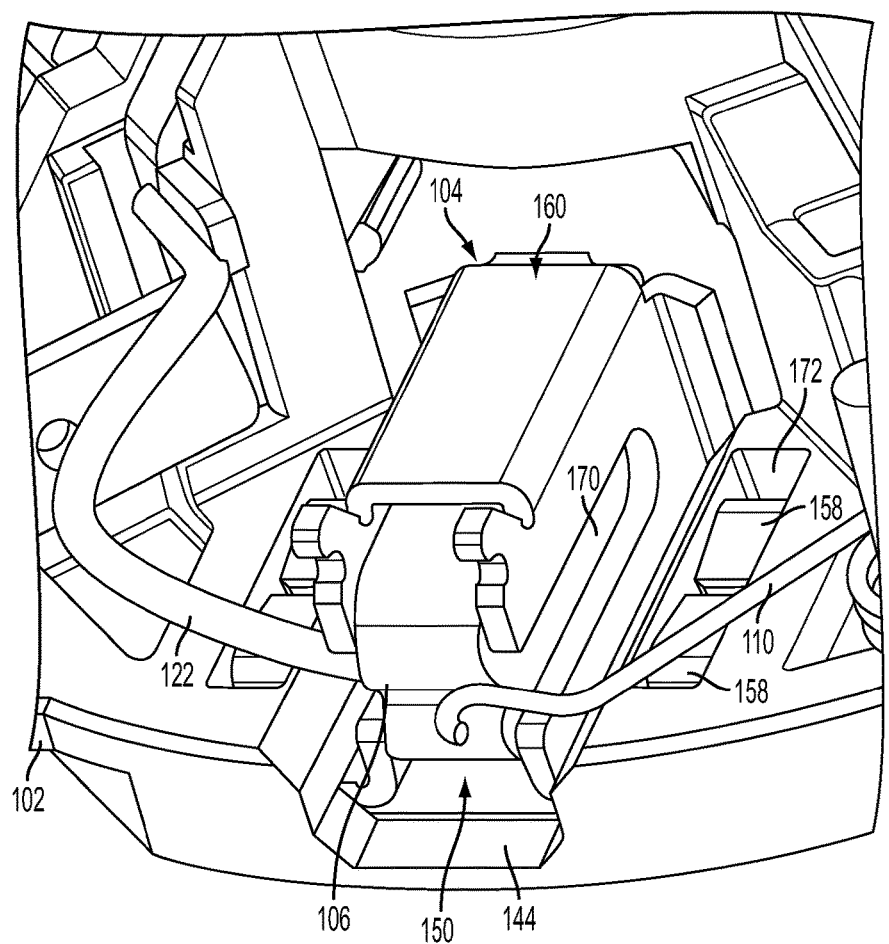
FIG. 10 depicts a zoomed-in perspective view of the top surface of the brush card mount 100 showing the upwardly-projecting legs 158 crimped over the top surface of the brush card mount 102 within recessed pockets 172, according to an embodiment.
Figure 11A:
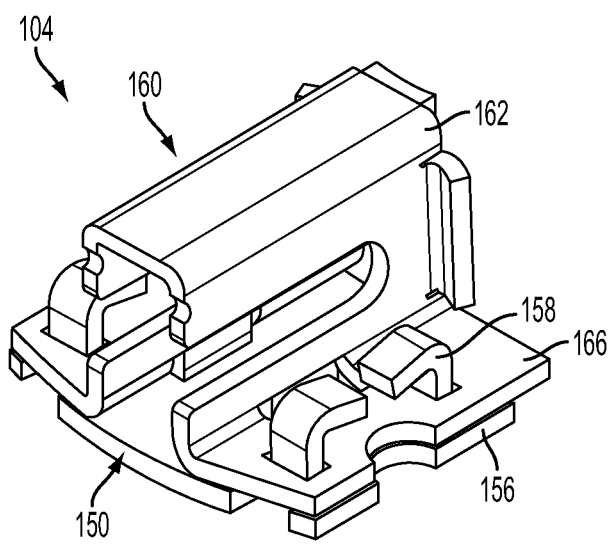
FIGS. 11A through 11D depict various views of the brush holder 104, including the base piece 150 and the main piece 160 crimped together, according to an embodiment.
Figure 11B:
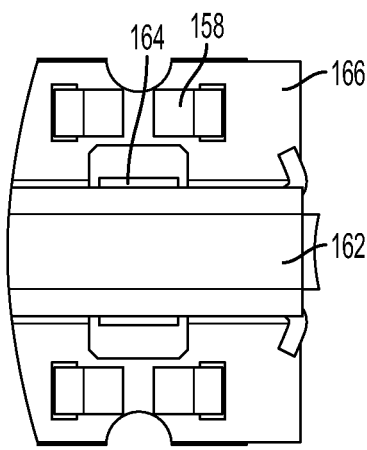
Figure 11C:
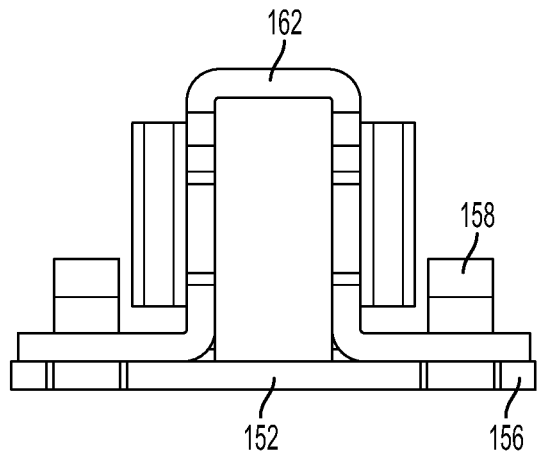
Figure 11D:
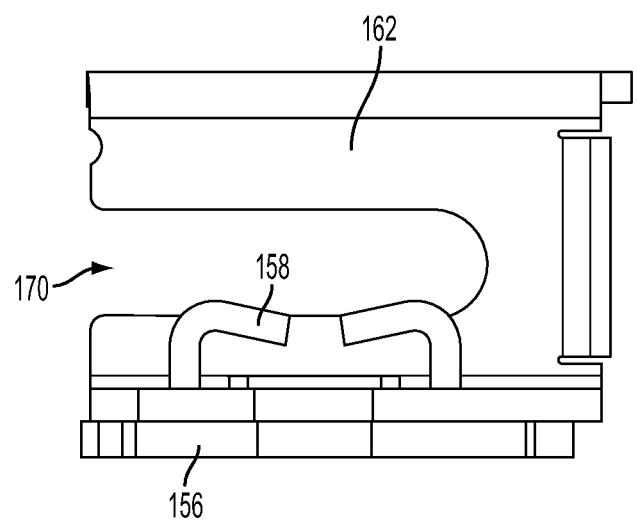

FIG. 10 depicts a zoomed-in perspective view of the top surface of the brush card 100 showing the upwardly-projecting legs 158 crimped over the top surface of the brush card mount 102 within recessed pockets 172. Recessed pockets 172 each include two slanted surfaces (see FIG. 4) between the slots 146. Crimped portions of the upwardly-projecting legs 158 rest on these slanted surfaces once they are crimped.

It is noted with reference to FIG. 10 that the top surface of the boundary portion 144 of the brush card mount 102 is recessed to accommodate insertion of the brush 106 inside the brush holder 104 once the brush holder 104 assembly is complete. It is further noted that openings 170 of the brush holder 104 are arranged to accommodate the back and forth movement of the spring 110 and the wires 122 along with the brush 106.

FIGS. 11A through 11D depict various views of the brush holder 104, including the base piece 150 and the main piece 160 crimped together. The brush card mount 102 is not shown in these figures. However, as discussed above, in the fully-assembled brush card 100, areas of the brush card mount 102 between recessed surfaces 142 and recessed pockets 172 are sandwiched between the crimp portions of the upwardly-projected legs 158 and the top surfaces of the flat portions 166 of the brush holders 104.

The brush holder design of the invention discussed herein provides several advantages. The two-piece assembly of the brush holders into the brush card mount is relatively easy. Furthermore, since the brush holders are inserted through a rear surface of the brush card mount, the metallic base pieces 150 of the brush holders 104 are exposed in close proximity to the motor fan. The brush holders 104 thus act as heat sink to transfer heat away from the brush holders 104 and brushes 106. This arrangement substantially improved overall heat transfer from the brush card 100.

Figure 12:
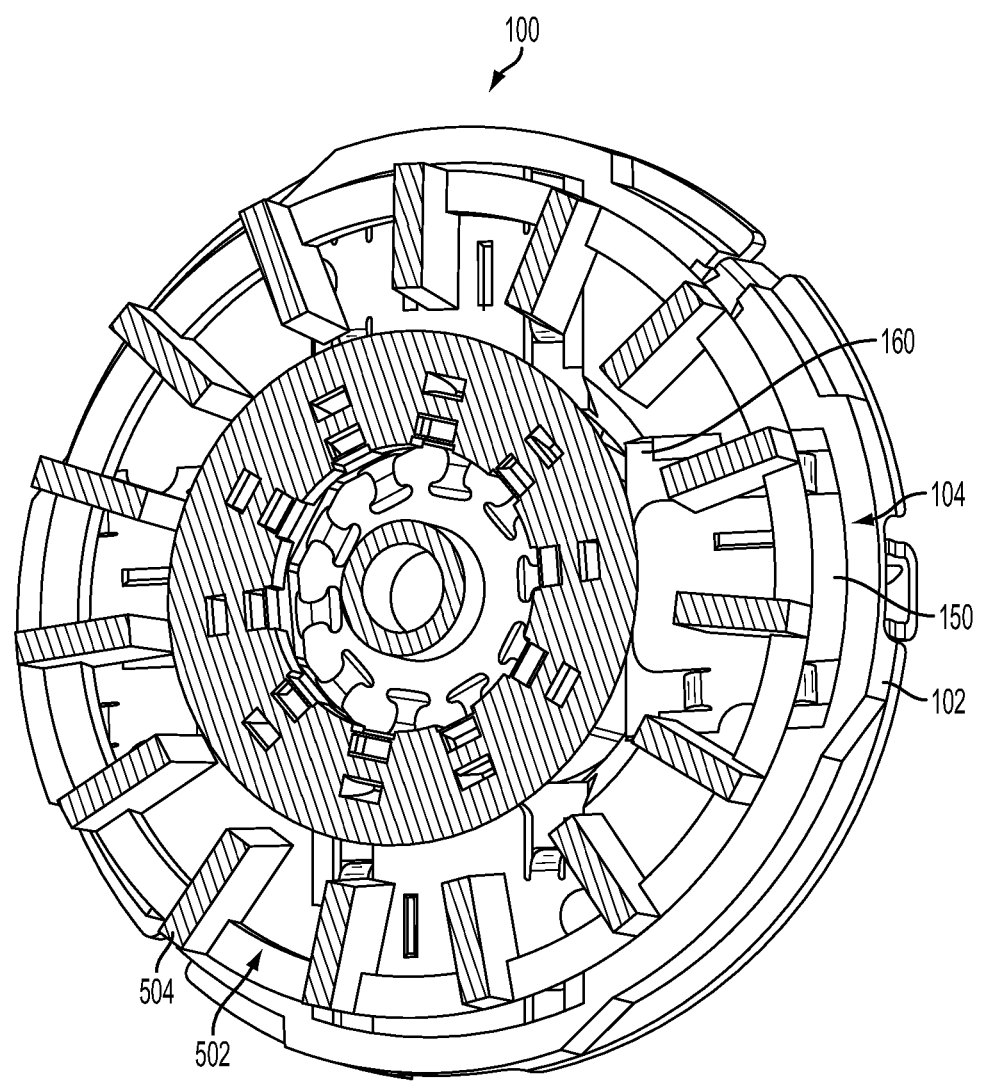
FIG. 12 provides a rear perspective view of the brush card 100 and a cut-off portion of a motor fan 502, according to an embodiment.

FIG. 12 provides a rear perspective view of the brush card 100 and a cut-off portion of a motor fan 502, according to an embodiment of the invention. As shown herein, in an embodiment, the brush holders 104 occupy at least 40% of the total surface area of the rear surface of the brush card 100. Preferably, the brush holders 104 take up at least 45% of the total area of the surface area of the rear surface of the brush card 100. More preferably, the brush holders 104 take up at least 50% of the total area of the surface area of the rear surface of the brush card 100. Furthermore, in an embodiment of the invention as discussed in detail below, the rear surface of the brush card 100 (including the brush card mount 102 and brush holders 104) acts as a baffle for the fan 502. As the motor fan 502, including the motor blades 504, spins, air is sucked through air vents disposed across the top surface of the brush card 100, through and around the brush card 100, into the fan 605. The air is then expelled radially between the fan 502 and the brush card 100 through air outlets disposed in alignment with the fan 502. The generated air flow thus makes substantial contact with the rear surface of the brush holders 104, which act as heat sinks for the respective brush holders 104 and brushes 106, allowing them to cool down. This design substantially improves heat control over the conventional design of FIG. 8 discussed above.

Brush Holder with Extruded Heat Sink

Figure 13A:
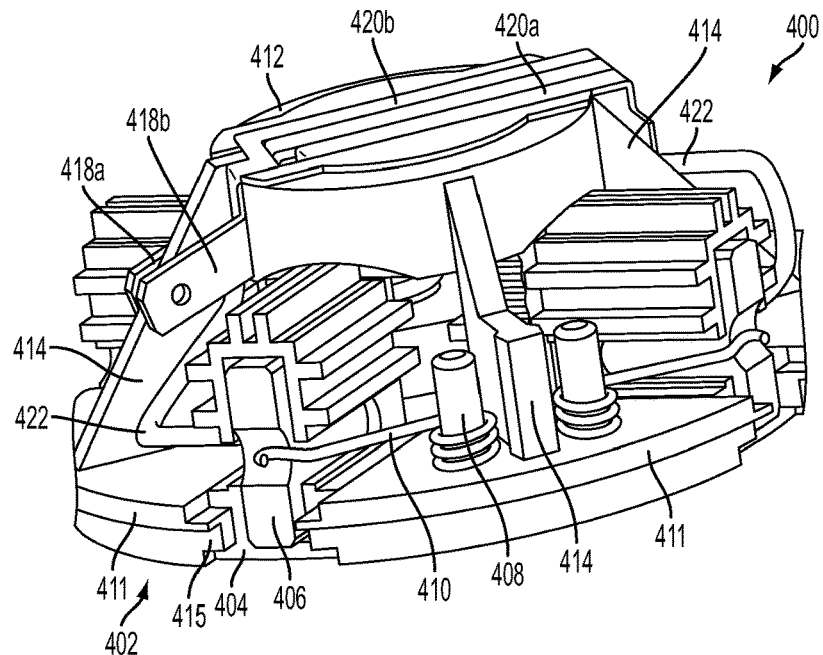
FIG. 13A depicts a perspective view of a brush card 400 having a modified (extruded) brush holder 404 design, according to an alternative embodiment.

An alternative brush holder design is discussed herein with reference to FIGS. 13A-14B, according to an embodiment of the invention. FIG. 13A depicts a perspective view of a brush card 400, according to this embodiment. The brush card 400 includes a brush card mount 402 and brush holders 404. As in the previous embodiment, brush card mount 402 has a substantially circular periphery and the four brush holders 404 are arranged equidistantly around the periphery of the brush card mount 402. The brush holders 404 facing each other are electrically connected to one another. Each brush holder 404 houses a brush 406 therein. Both ends of each brush holder 404 are open to allow radial movement of the bush towards a center of the brush card 400. The brush card mount 402 includes posts 408 in close proximity to the brush holders 404. The posts 408 accommodate springs 410, each of which includes an extended arm that engages a back portion of a corresponding brush 406 to bias the brush 406 towards the center of the brush card 400. Metal routings 420a, 420b are disposed on (over or within) bridge portion 412 to connect brushes 406 that are arranged opposite each other. As in the previously-described embodiments, metal routings 420a, 420b cross over each other within bridge portion 412. Terminals 418a, 418b are disposed at the ends of the metal routings 420a, 420b.

Figure 13B:
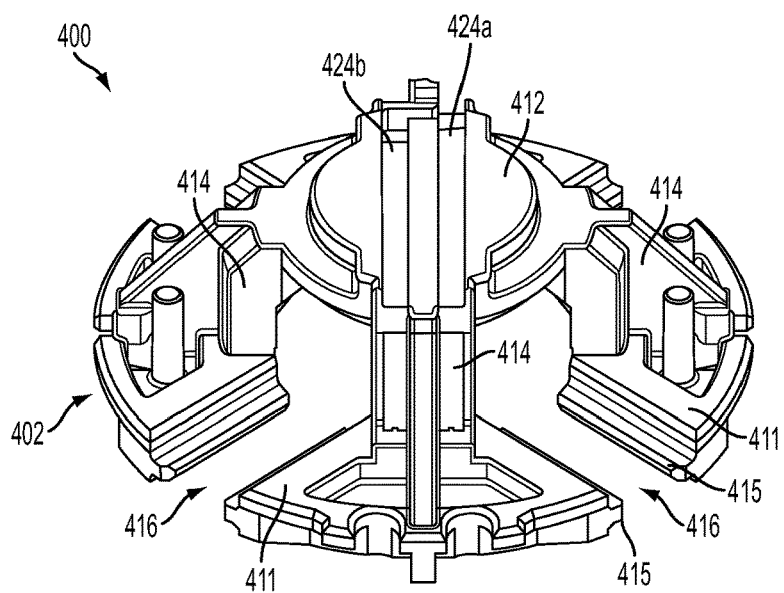
FIG. 13B depicts a perspective view of the brush card 400 without the brush holders 404, according to an embodiment.

FIG. 13B depicts a perspective view of the brush card 400 without the brush holders 404. According to an embodiment, similarly to the previous embodiments, bridge portion 412 includes channels 424a, 424b formed therein for placement of metal routings 420a, 420b. Unlike the previous embodiment shown in FIGS. 9A-12, a planar portion of the brush card mount 402 includes four separate planar pieces 411 connected together via legs 414 of bridge portion 412. In other words, unlike the previous embodiment where boundary portions 144 of the brush card mount 102 define openings 140 for receiving the brush holder 104, the planar pieces 411 in this embodiment are not connected to one another along the main plane of the brush card mount 400. Instead, planar openings 416 between the planar pieces 414 receive the brush holders 404 in a radial direction. Planar pieces 411 include side guides 415 arranged to be received in corresponding grooves of the brush holders 404, as discussed below.

In an alternative embodiment, planar openings 416 may be open-ended on the outer end for receiving the brush holders 404, but close ended on the inner end to mechanically join the planar pieces 411 to one another. In yet another embodiment, planar openings 416 may be open-ended on the inner end for receiving the brush holders 404, but close ended on the outer end to mechanically join the planar pieces 411 to one another. Placing a ring on either the inner or outer circumferences of the planar pieces 411 to connect the planar pieces 411 together provides mechanical support for the brush card 400 and enhances the moldability of the planar pieces 411 during the manufacturing process.

Figure 14A:
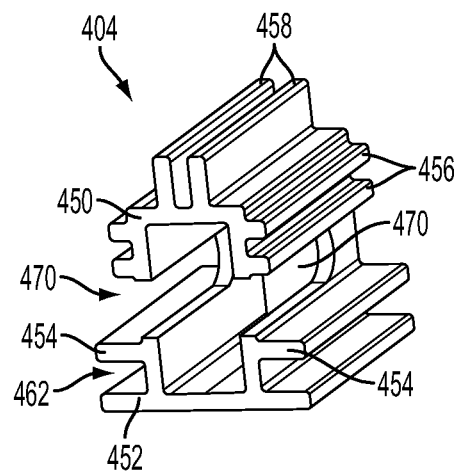
FIGS. 14A and 14B depict perspective and cross-sectional views of the brush holder 404, according to an embodiment.
Figure 14B:
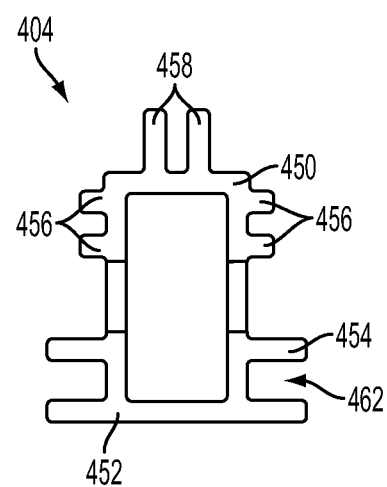

FIGS. 14A and 14B depict perspective and cross-sectional views of the brush holder 404, according to an embodiment. Brush holder 404 in this embodiment includes a main body 450 and a base portion 452 formed together integrally as one piece. The main body 450 includes openings 470 for facilitating the back and forth movement of the springs 410 and the wires 422. The main body 450 includes side projections 454, which together with ends of the base portion 454 form grooves 462. Grooves 462 receive side guides 415 of the brush card mount 402 as the brush holders 404 slides into planar openings 416. In an embodiment, the grooves 462 are press-fitted onto the guides 415. In an alternative embodiment, an adhesive is used to secure the guides 415 inside the grooves 462.

According to an embodiment, once the brush holders 404 are fitted between the planar pieces 411, a lower surface of the base portion 452 acts as a heat sink to carry heat away from the brush card 400, including the brush holder 404 and the brushes 406, similarly to the previous embodiment. Additionally, in an embodiment, the brush holder 404 includes projections 456, 458 projecting from the main body 450. In an exemplary embodiment shown herein, four side projections 456 and two top projections 458 are provided. Projections 456 and 458 increase the total surface area of the brush holder 404, thereby improving heat transfer away from the brush holder 404.

It must be noted that while projections 456, 458 shown in FIGS. 14A and 14B are used with a single-piece brush holder design, the same projections may be incorporated into the two-piece design of FIGS. 9A-12 to improve heat transfer.

Motor Fan Assembly

Figure 15:
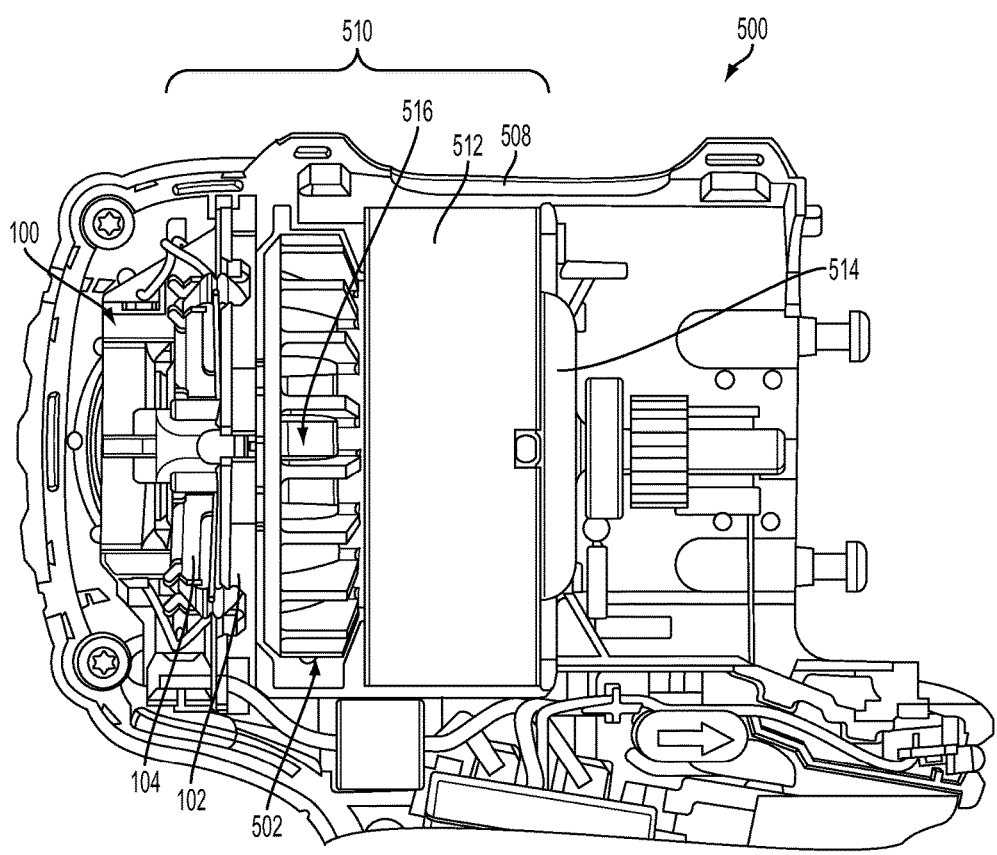
FIG. 15 depicts a partial cross-sectional view of a power tool 500 including a motor assembly 510 having a brush assembly 100, a stator 512, a rotor 514, and a fan 502, according to an embodiment.
Figure 16A:
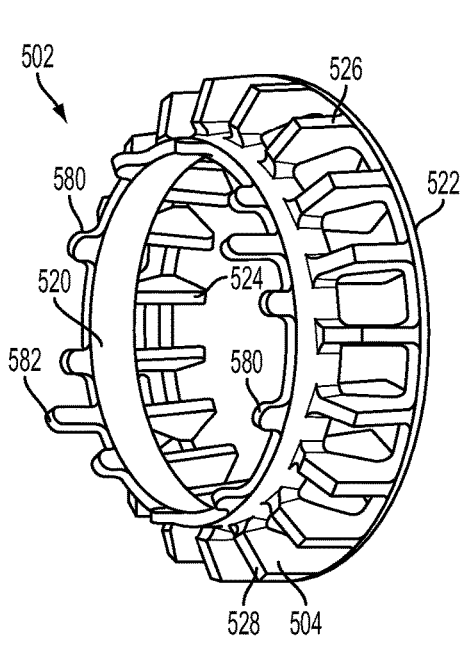
FIGS. 16A-16C depict various perspective and side views of the fan 502, according to an embodiment.
Figure 16B:
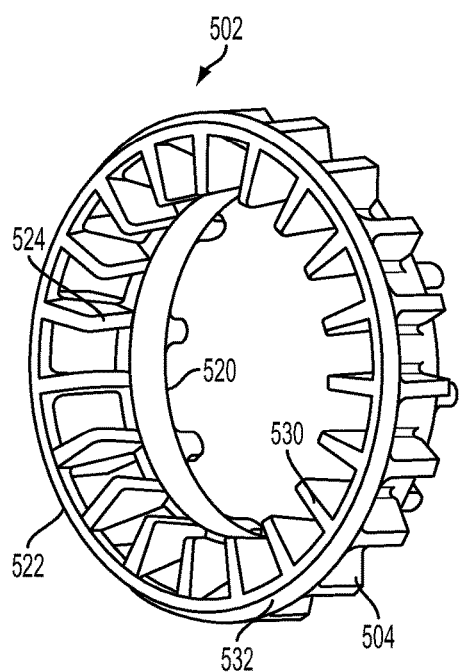
Figure 16C:
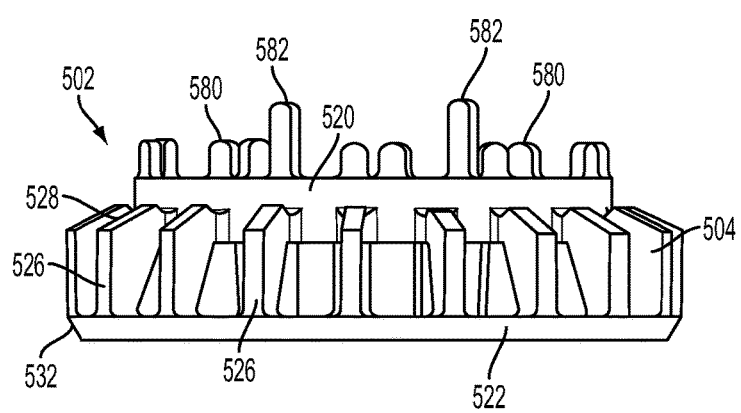
Figure 17:
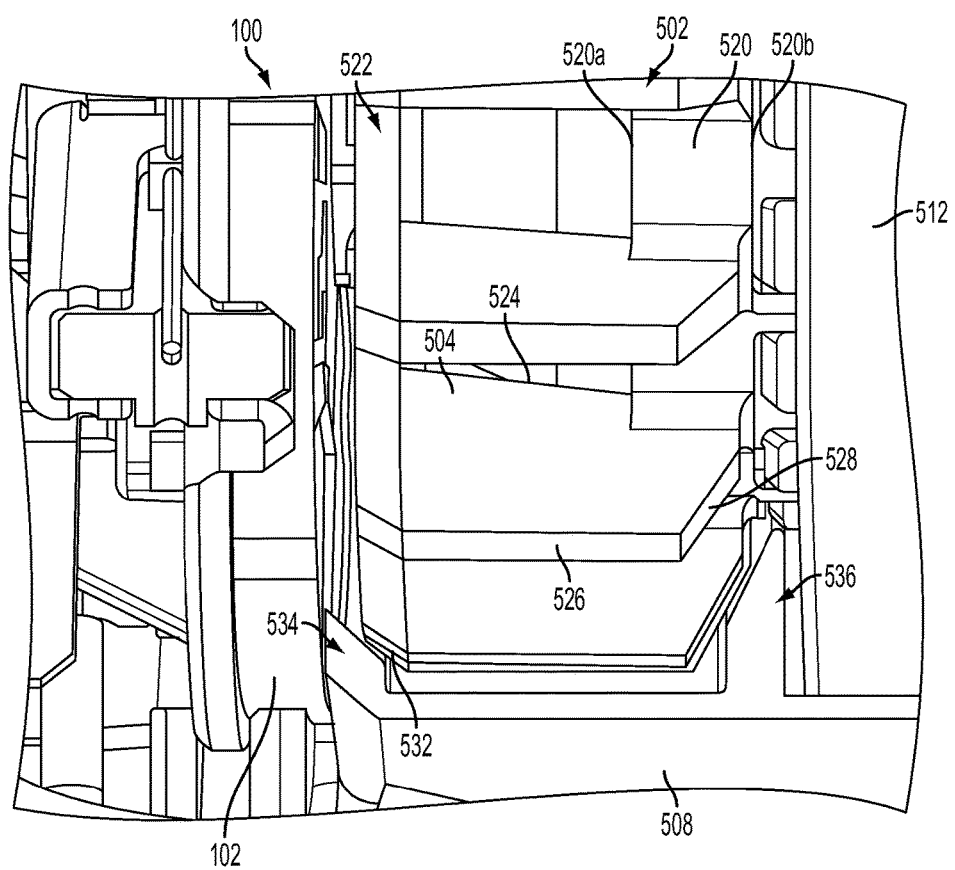
FIG. 17 depicts a zoomed-in view of the fan 502 inside the tool housing 508, according to an embodiment.

Another aspect of the invention is discussed herein with reference to FIGS. 15-17. FIG. 15 depicts a partial cross-sectional view of a power tool 500, according to an embodiment. In this embodiment, one half of the power tool housing 508 is shown for illustration purposes, though it is understood that the second half of the power tool housing includes more or less the same or similar features. The power tool 100 in this embodiment includes the brush card 100, including the brush card mount 102 and the brush holders 104, disposed at one end of the housing. Motor 510 in this embodiment includes a motor stator (i.e., can) 512, a rotor 514, and a commutator 516 rotatably coupled to the rotor 514. The commutator 516, only a portion of which is visible in this figure, is disposed inside the brush card 100 between the four brushes 106. The fan 502 is also rotatably attached to the rotor 514. The operation of the motor 510 and its components is beyond the scope of this disclosure and is not discussed in further detail, but reference is made to U.S. Pat. No. 7,126,242 issued Oct. 24, 2006, which is incorporated by reference in its entirety, as an example of an electric motor.

FIGS. 16A-16C depict various perspective and side views of the fan 502, according to an embodiment. FIG. 17 depicts a zoomed-in view of the fan 502 inside the tool housing 508. As shown in these figures, fan 502 includes a plurality of blades 504 arranged between a first inner ring 520 and a second outer ring 522. The inner ring 520 is arranged to mate with the rotor 514, while the second ring 522 is disposed in the proximity of the brush card 100, as shown in FIG. 15. Each fan blade 504 includes an inner edge 524 that extends from a first end 520a of the inner ring 520 towards the rear surface of the brush card 100. In an embodiment, the inner edge 524 is inclined towards the armature 516 and the rotor 514 (i.e., at an angle to the longitudinal axis of the motor 510), though the inner edge 524 may be parallel to the tool housing in an alternative embodiment. Each fan blade 504 also includes an outer edge 526 that extends from the outer ring 522 towards the stator 512 substantially in parallel with the longitudinal axis of the motor 510. A first side edge 528 extends from a second end 520b of the inner ring 520 to the end of the outer edge 526. The first side edge 528, in an embodiment, is arranged at an angle away from the stator 512 in the direction of the end of the outer edge 526. A second side edge 530 extends from the outer ring 522 to the end of the inner edge 524, substantially parallel to the rear surface of the brush card 100. In an alternative embodiment, however, the second side edge 530 may be inclined slightly towards the brush card 100 as it meets the inner edge 524.

Since the inner edge 524 of the blades covers less air that the outer edge 526 of the blades as the fan 502 spins, inner edge 524 generates lower air velocity near the center of the fan. In order to generate equal air velocity throughout the fan 502, it is desirable for the inner edge 524 to be longer than the outer edge 526. The embodiment of the invention discussed above ensures that the length inner edge 524 of each blade 504 is greater than the length of the outer edge 526. According to a further embodiment of the invention, the outer surface of the inner ring 522 includes a slanted surface 532 that is arranged at an angle away from the brush card 100 in the direction of the outer edge 526. In an embodiment, this slanted surface 532 may be arranged at at least a 45 degree angle with respect to the rear surface of the brush card 100. This arrangement helps reduce the length of the outer edge 526 of each blade 504 even further for more effective air flow generation.

Figure 18:
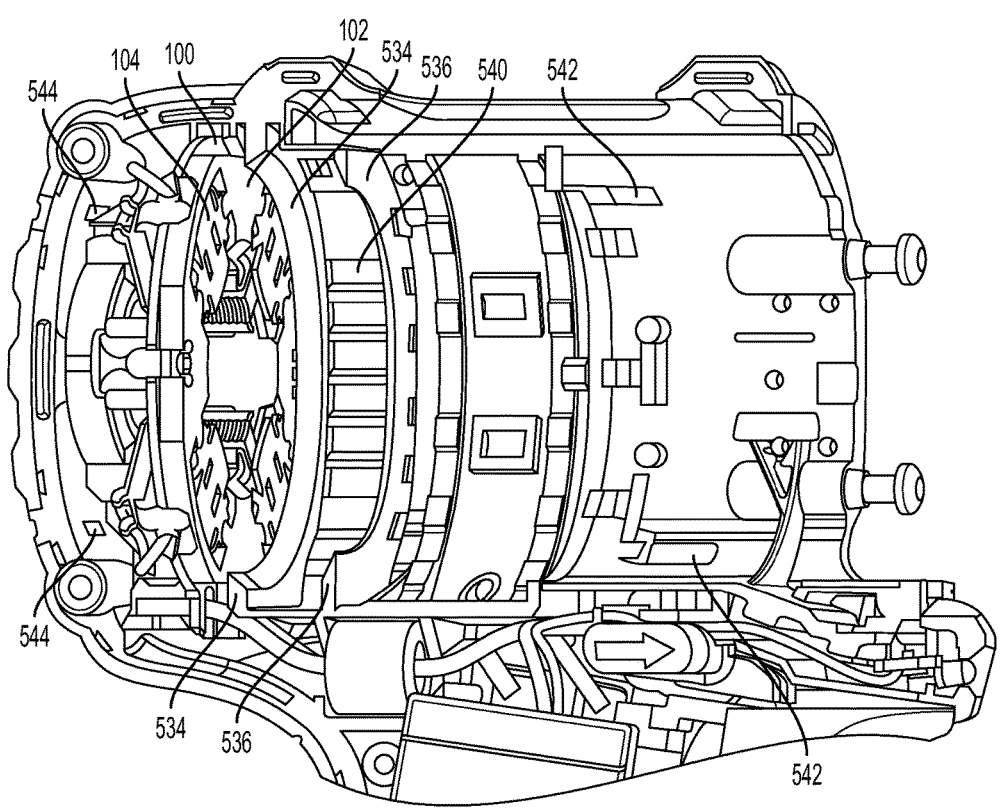
FIG. 18 depicts a cross-sectional view of a tool housing 508 including the brush card 100, without the motor 510 and the fan 502, according to an embodiment.

FIG. 18 depicts a cross-sectional view of a tool housing 508 including the brush card 100, without the motor 510 and the fan 502. According to an embodiment of the invention, air inlets 542 and 544 are provided in the rear and center portion of the power tool housing 508. As the fan 502 rotates, it generates an air flow from front inlets 542 through the motor 510, in particular in the area between the stator 512 and the rotor 514, in an axial direction to cool the motor 510. The air is then redirected in a radial direction out of the power tool 500 through air vents 540 disposed in the tool housing 508 adjacent the fan 502. Similarly, the fan generates an air flow from rear inlets 544 through the brush card 100, particularly around the brush holders 104, and through the area between brush holders 104 and the commutator 516, in an axial direction to cool the brush card 100. This air is also redirected in a radial direction out of the power tool 500 through the same air vents 540. The rear surface of the brush card 100 (i.e., brush card mount 102 together with the brush holders 104) forms a baffle to contain the air flow inside the fan 502 and out of the vents 540. Similarly, the end surface 513 of the stator 512 facing the fan 502 forms a second baffle for the fan 502. These baffles ensure that the air is properly redirected through the vents 540.

The angled surface of the first side edge 528 creates a gap between the stator 512 end surface baffle and the fan 502. Similarly, the angled surface of the outer ring 522 creates a gap between the brush card 100 baffle and the fan 502. These gaps may adversely affect air flow through the fan 502. In order to prevent such an adverse affect, according to an embodiment of the invention, two ribs 534 and 536 corresponding to the slanted surface 532 of the outer ring 522 and the first side edge 528, respectively, are provided in the tool housing 508. In an embodiment, the first rib 534 includes a sloped surface disposed in close proximity to and in parallel with the slanted surface 532 of the outer ring 522. Similarly, the second rib 536 includes a sloped surface in close proximity to and in parallel with the first side edge 528 of the fan 501. Both ribs 534 and 536 also include surfaces that are in contact with the rear surface of the brush card 100 (including a portion of the brush holders 104 and the brush card mount 102) and the end surface 513 of the stator 512, respectively. The ribs 534 and 536 are both ring-shaped and extend around the two housing halves to fully close the gaps between the housing 508 and the fan 502 created by the angled surfaces of the outer ring 522 and the first side edge 528. In this embodiment, a combination of the rear surface of the brush card 100 (including the brush card mount 102 and the brush holders 104), and the sloped surface of the first rib 534, forms the first baffle for the fan 502. Similarly, a combination of the end surface 513 of the stator 512 and the sloped surface of the second rib 536 forms the second baffle for the fan 502. Additionally, in an embodiment, the ribs 534 and 536 provide alignment features for placement of the brush card 100 and the stator 512 within the power tool housing 508.

Rotor End Insulator

Another aspect of the invention is disclosed herein with reference to FIGS. 19-21C, and with continued reference to FIGS. 16A-16C.

Figure 19:
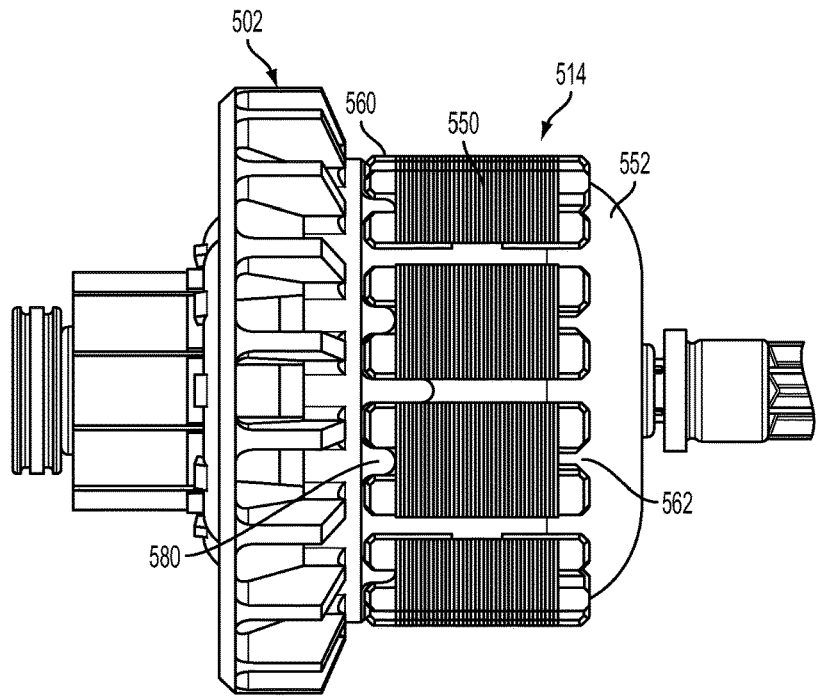
FIG. 19 depicts the fan 502 mounted on a fully wound and molded rotor 514, according to an embodiment.
Figure 20:
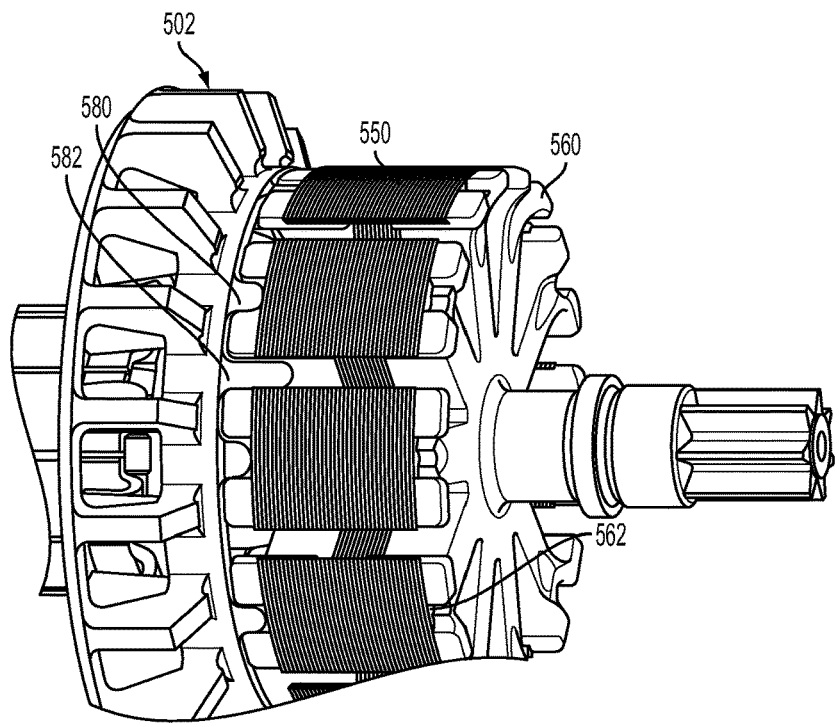
FIG. 20 depicts a perspective view of the same fan 502 and rotor 514 without the windings 552, according to an embodiment.

FIG. 19 depicts the fan 502 mounted on a fully wound and molded rotor 514. In this figure, the rotor 514 includes a lamination stack 550, windings 552, and end insulators 560. End insulators 560 are disposed at the ends of the lamination stack 550 prior to the lamination stack 550 being wound. End insulators 560 provide insulation between the rotor windings and the rotor lamination stack 550 and protect the wires from being cut during the winding process. FIG. 20 depicts a perspective view of the same fan 502 and rotor 514 without the windings 552.

According to an embodiment of the invention, in order to property attach the fan 502 to the rotor 514, the fan 502 is provided with a plurality of tongues 580, as shown in FIGS. 16A, 16C, 19 and 20. Tongues 580 in an embodiment project in the direction of the rotor 514 from the inner ring 520 of the fan 502. In an embodiment, tongues 580 may be 2-6 mm in length. In an embodiment, tongues 580 may be disposed equidistantly around the periphery of the inner ring 510. The number of tongues 580 may correspond to the number of slots in the lamination stack 550, although a lesser number of tongues 580 may be provided. According to an embodiment of the invention, end insulator 560 facing the fan 502 is provided with a plurality of notches 562 arranged to receive the tongues 580 of the fan 502, as discussed below in detail.

Figure 21A:
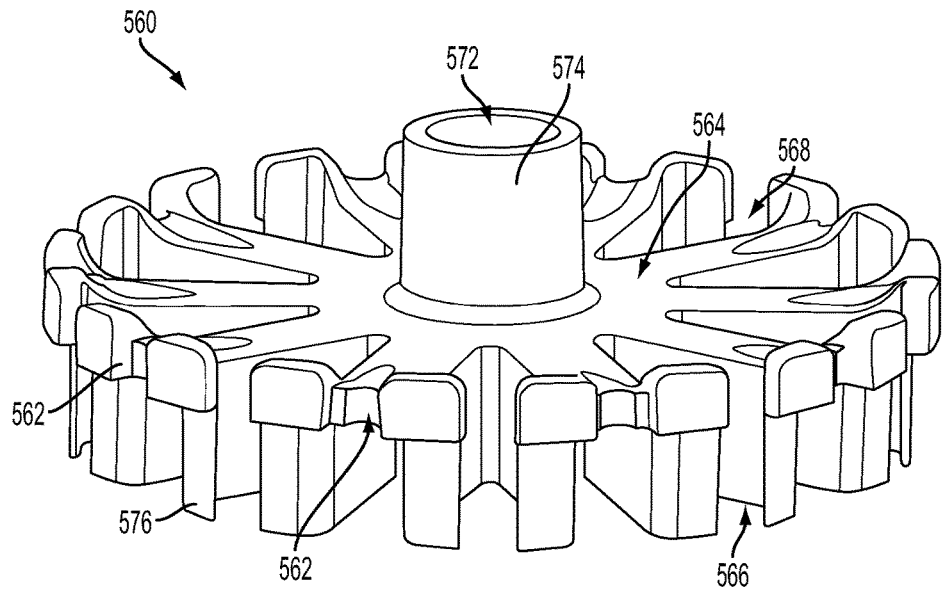
FIGS. 21A-21C depict perspective views of a rotor end insulator 560, according to an embodiment.
Figure 21B:
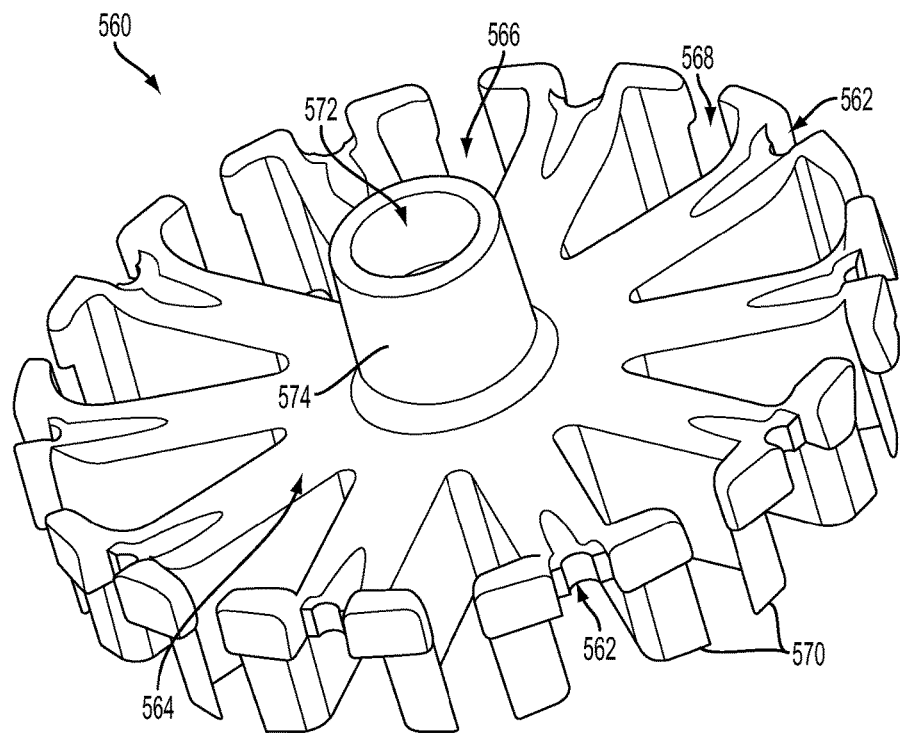
Figure 21C:
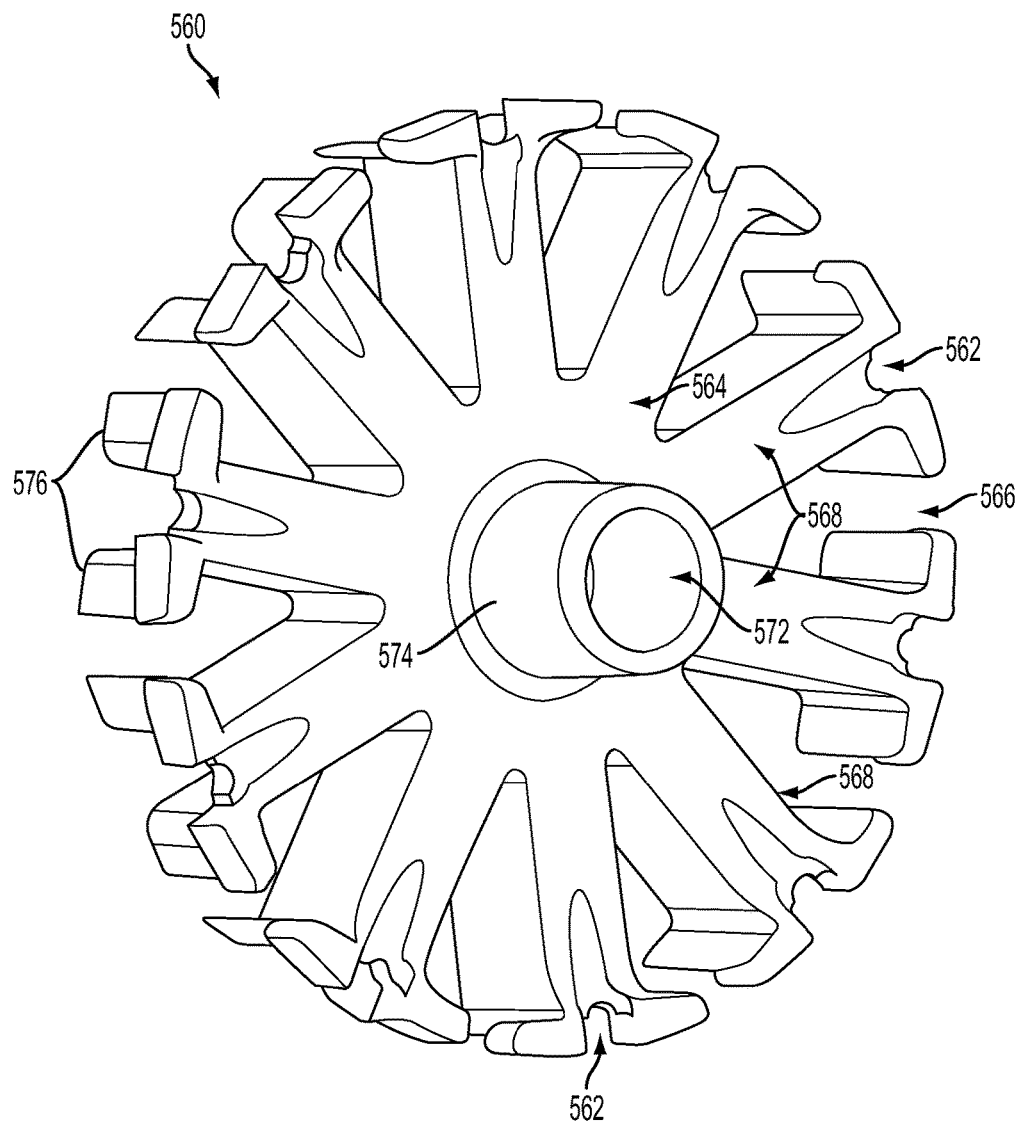

FIGS. 21A-21C depict perspective views of a rotor end insulator 560, according to an embodiment of the invention. End insulator 560 is pre-molded to include a base portion 564 shaped to match a cross-sectional profile of the lamination stack 550. The base portion 564 includes radially-extending slots 566 formed between teeth 558 of the base portion 564. The slots 566 and teeth 568 respectively correspond to the slots and teeth of the lamination stack 550. At the periphery of the base portion 564, the teeth 568 extend outwardly along the circumference of the base portion 564 to partially close the outer end of the slots 566. The slots 566 of the base portion 564 have walls 570 projecting perpendicularly to the base portion 564 (in the longitudinal direction of the motor) on one side. The walls 570 are arranged to form-fittingly protrude into the slots of the lamination stack 550 to insulate the lamination stack teeth. The walls 570 may be, for example, 4 to 12 mm in depth.

The base portion 564 includes a through-hole 572 at its center portion for accommodating the rotor shaft. On the side of the base portion 564 opposite where the walls 570 are arranged, is an annular ring 574 fitted over the rotor shaft.

In an embodiment, two end insulators 560 are form-fittingly mounted on the ends of the lamination stack 550. In an embodiment, there may be a gap of, for example, 2 to 10 mm between the ends of the inner walls 570 of the two end insulators 560 within the lamination stack 550 slots. As the coils are wound into the lamination stack slots over the end insulators 560, the thickness of the walls 570 ensures that no contact is made between the coil and the lamination stack 560. Furthermore, the outer surface of the base portion 564 has a slanted profile near the outer ends of the teeth 568 that forces the coils to be packed tightly into the lamination stack slots.

According to an embodiment of the invention, as mentioned above, notches 562 are arranged at the outer ends of the teeth 568 on the periphery of the end insulator 560 to receive the tongues 580 of the fan 502. The notches 562 extend longitudinally through the entire length of the teeth 568. This arrangement allows the tongues 580 of the fan 502 to make direct contact with the end of the lamination stack 550. This embodiment reduces the tolerances associated with the motor over a comparable design in which the fan 502 is mounted on the end insulator 560. Specifically, since the tongues 580 are mounted directly on the lamination stack 550, calculating the total tolerances for the fan 502 needs only take into account the tolerance levels of the fan 502 and the lamination stack 550, and not the tolerance levels of the end insulator 560, which is made of plastic and has a relatively large tolerance. It is noted that tongues 580 may be secured within the notches 562 form-fittingly, or via heat-taking, welding, adhesive-bonding, etc.

According to an embodiment of the invention, with reference to FIGS. 16A-16C, 19 and 20, the fan 502 may be further provided with one or more additional tongues 582 arranged on opposite ends of the inner ring 520. In an embodiment, tongues 582 are longer than tongues 580 and are arranged to be received between two adjacent teeth of the lamination stack 550. Long tongues 582 are provided to ensure that tongues 580 are placed inside the notches 562, and not between the adjacent teeth of the lamination stack 550, during assembly.

Spring Assembly

Figure 22:
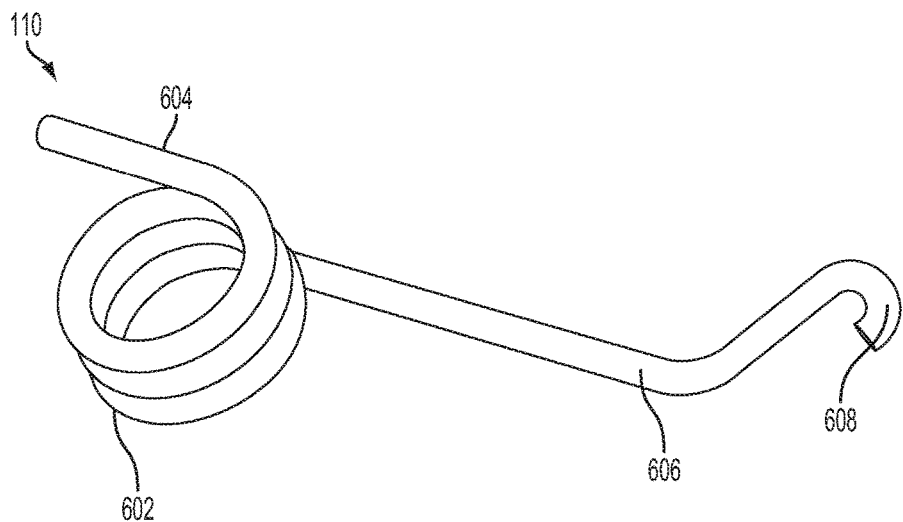
FIG. 22 depicts a spring 110 used in the brush card 100, according to an embodiment.
Figure 23:
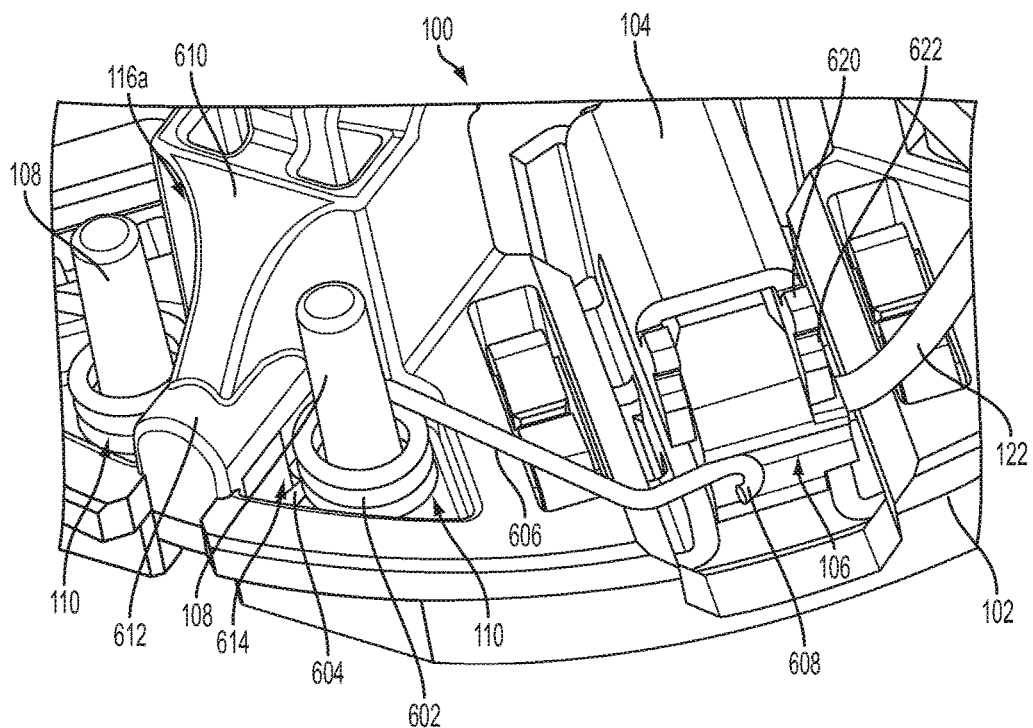
FIG. 23 depicts a partial perspective view of the brush card 100 with the spring 110 inserted on the post 108 and engaging the brush 106, according to an embodiment.
Figure 24:
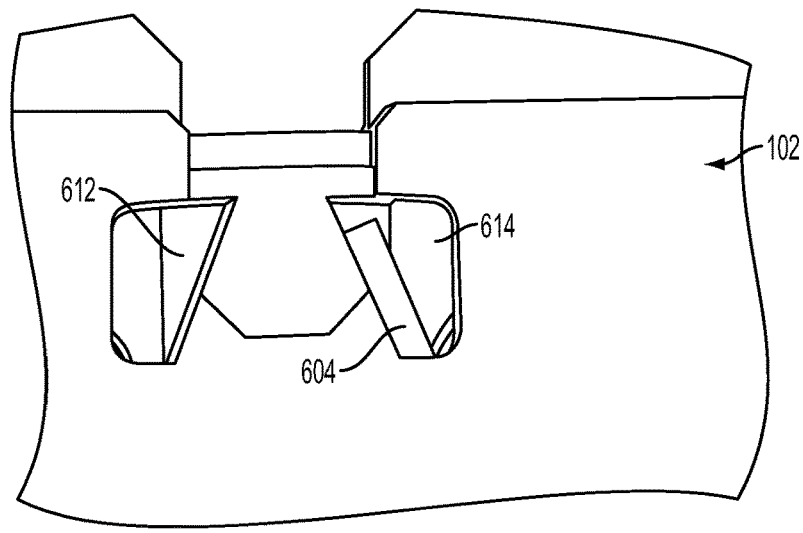
FIG. 24 depicts a rear view of the brush card 100 showing the first leg 604 of the spring 110 inside the pocket 614, according to an embodiment.

Another aspect of the invention is discussed herein with reference to FIGS. 22-24. FIG. 22 depicts a spring 110, according to an embodiment. Spring 110 includes a wound portion 602, a first leg 604, and a second leg 606 that is longer than the first leg 604 and includes a hook 608 at its distal end.

FIG. 23 depicts a partial perspective view of the brush card 100, according to an embodiment. In this embodiment, the wound portion 602 of the spring 110 is arranged around the post 108 of the brush card mount 102. The hook 608 of the second leg 606 engages the back of the brush 106. The first leg 604 of the spring 110 engages a pocket 614 of the brush card mount 102. In an embodiment, pockets 614 for each spring 110 are formed within end portions of the bridge legs 116a, 116b on both sides (e.g., close to the periphery of the brush card mount 102). The position of the first leg 604 within the pocket 614 allows the torsion spring 110 to be loaded as it engages the back of the brush 106.

During the assembly process, in one embodiment, the first leg 604 is placed within the pocket 614 as the wound portion 602 is pushed down the post 108. The second leg 606, which at this point rests on top of the brush holder 104, is then pulled to engage the back of the brush 106 (or an end portion 620 of the brush holder 104). The problem with this assembly process, however, is that it is difficult to engage and move the second leg 606 after the wound portion 602 has been pushed down the post 108. This process is time consuming and burdensome.

According to an embodiment of the invention, in order to ease the assembly process of the springs 110, the end of the bridge legs 116a, 116b are each provided with an arcuate surface 612, as shown in FIG. 23. Arcuate surface 612 is located above the pockets 614. A sloped surface 610 is provided extending from the top of the bridge leg 116a or 116b to the top of the arcuate surface 612. During the assembly process, after the wound portion 602 is placed on the post 108 but before it is pushed down, the hook 608 of the second leg 606 of the spring 110 is placed within a recess 622 of the end portion 620 of the brush holder 104. The first leg 604 at this point is placed on the sloped surface 610 or the arcuate surface 612. As the round portion 602 of the spring 110 is pushed down, the hook 608 remains within the recess 622. Meanwhile, the end of the first leg 604 slides down the sloped surface 610 over the arcuate surface 612, and along the arcuate surface 612 until it snaps into the pocket 614. As the first leg 604 moves down the arcuate surface 612 it loads the torsion spring 110, so the spring 110 will be loaded even after the first leg 604 snaps into the pocket 614.

FIG. 24 depicts a rear view of the brush card 100 showing the first leg 604 of the spring 110 inside the pocket 614, according to an embodiment. As seen herein, the pockets 614 for adjacent springs 110 are located under the arcuate surface 612, forming a mushroom-shaped cross-sectional profile. The arcuate surface 612 may be shaped as a half-circle above the pockets 614, although a cam surface may be utilized to optimize the movement of the first leg 604 into the pocket 614.

Brush Design

Figure 25:
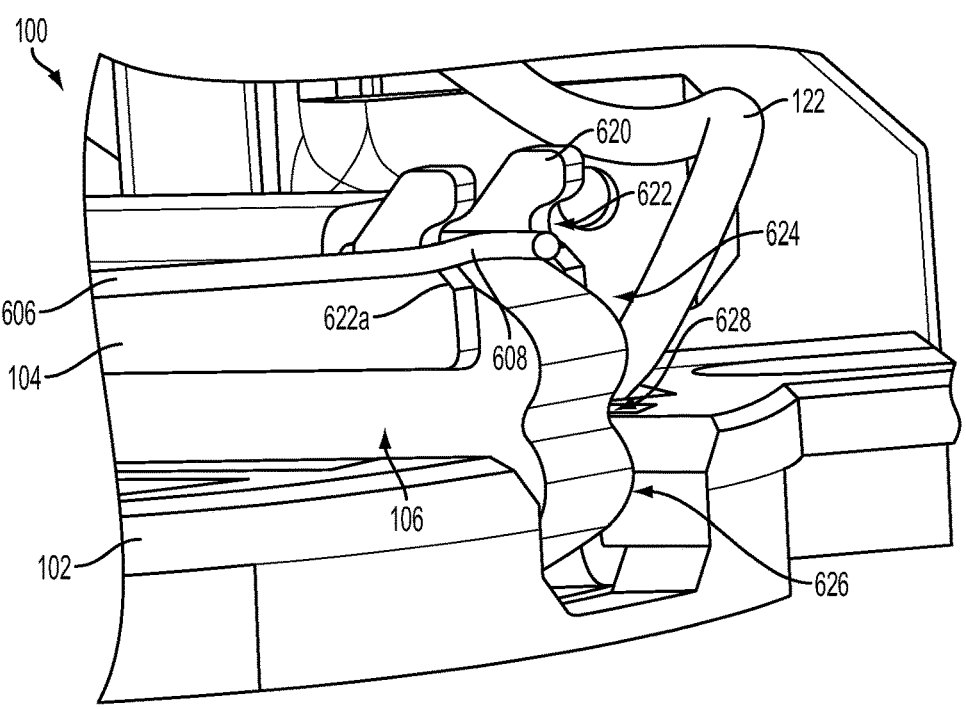
FIG. 25 depicts a brush 106 inside the brush holder 104, according to an embodiment.

Another aspect of the invention is described herein with reference to FIG. 25. In this figure, brush 106 is shown inside the brush holder 104. As discussed above, the hook 608 of the spring 110 engages the recess 622 of the end portion 620 of the brush holder during the assembly process. Once the motor is fully assembled and the commutator is placed inside the brush card 100, the hook 608 and the second leg 606 are pulled down to engage the rear surface of the brush 106.

According to an embodiment of the invention, in order to ease the above-described step, the rear surface of the brush 106 includes two humped surfaces 624 and 626 and a groove 628 therebetween. The rear surface of the brush 106 is designed and arranged such that, after the motor is assembled and the commutator is placed inside the brush card 100, a portion of the humped surface 624 is aligned with a lower end of the recess 622. Specifically, the recess 622 includes a slanted lower end 622a which, as viewed from the side, ends in alignment with (or slightly above) the humped surface 624. Using this arrangement, instead of having to pull the hook 608 out of the recess 622 and push it down inside the groove 628, the second leg 606 of the spring 110 is simply pushed down. As the second leg 606 is pushed down, the hook 608 (or the second leg 606) slides down the slanted lower end 622 of the recess, onto and over the humped surface 624, and into the groove 628. This design substantially eases the assembly process.

In this embodiment, each the humped surfaces 624 may be semi-circular shaped, although a cam surface may be utilized to optimize the movement of the hook 608 over the humped surface 624. It is also noted that two humped surfaces are shown in this embodiment to ease the assembly process, but the brush 106 may include a single humped surface above the groove 628.

The description of the invention is merely exemplary in nature and, thus, variations that do not depart from the gist of the invention are intended to be within the scope of the invention. Such variations are not to be regarded as a departure from the scope of the invention.

The invention claimed is:
1. An electric motor comprising:
a stator;
an armature rotatably received within the stator, the armature having an armature shaft on which a commutator is mounted; and
a brush assembly disposed around the commutator and having a first surface facing the stator and a second surface opposite the first surface, the brush assembly comprising:
   a brush card mount having a plurality of openings;
   a plurality of brushes in sliding contact with the commutator to supply electric current to the commutator; and
   a plurality of thermally-conductive brush holders each having a base piece disposed substantially along a same plane as a surface of the brush card mount to form the first surface of the brush assembly, and a main piece protruding from the base piece through a respective opening of the brush card mount to house a respective brush at least partially over the second surface of the brush assembly,
   wherein the base piece is provided as a separate piece from the main piece,
   wherein the base piece includes a flat portion, and the main piece includes a brush-holder portion shaped to contain three sides of the brush and two flat portions extending from the ends of the brush-holder portion in parallel to the base piece,
   wherein the brush-holder portion of main piece is received through the opening of the brush card mount from the first surface and the flat portions of the main piece are sandwiched between the brush card mount and the base piece,
   wherein the base piece further includes a plurality of legs projecting substantially perpendicularly therefrom, and
   wherein the two flat portions of the main piece include slots corresponding to the legs of the base piece, and the brush card mount also includes slots corresponding to the slots of the main piece and the legs of the base piece.

2. The electric motor of claim 1, wherein the flat portions of the main piece are mounted on the base piece and the flat portion of the base piece surrounds a fourth side of the brush.

3. The electric motor of claim 1, wherein the base piece and the main piece include engaging features for proper alignment of the base piece and the main piece.

4. The electric motor of claim 1, wherein the brush card mount includes recessed surfaces around the plurality of openings within the first surface of the brush assembly and the base pieces of the brush holders are disposed within the respective recessed surfaces.

5. The electric motor of claim 1, wherein the brush card mount comprises: a planar portion disposed around the commutator; a bridge portion disposed at an end of the commutator and extending from the planer portion via a plurality of legs; and at least one metal routing disposed on the bridge portion to connect the plurality of brushes.

6. The electric motor of claim 1, wherein the brush assembly comprises: a plurality of upright posts disposed in close proximity to the plurality of openings on the second surface of the brush card mount, and a plurality of torsion springs disposed around the upright posts and engaging ends of the brushes.

7. The electric motor of claim 1, wherein the plurality of brushes includes at least four brushes arranged equidistantly on four sides of the brush assembly.

8. The electric motor of claim 1, wherein the the legs of the base piece are received through the slots of the brush card mount and slots of the main piece and crimped over the brush card mount within the second surface of the brush assembly to securely hold the brush holder to the brush card mount.

9. The electric motor of claim 8, wherein the brush card mount includes recessed pockets within the second surface and around the slots of the brush card mount, and crimped portions of the legs of the base piece engage the recessed pockets.

10. A power tool comprising:
a housing; and
an electric motor including a stator; an armature rotatably received within the stator, the armature having an armature shaft on which a commutator is mounted; and a brush assembly disposed around the commutator and having a first surface facing the stator and a second surface opposite the first surface,
the brush assembly comprising:
a brush card mount having a plurality of openings;
a plurality of brushes in sliding contact with the commutator to supply electric current to the commutator; and
a plurality of thermally-conductive brush holders each having a base piece disposed substantially along a same plane as a surface of the brush card mount to form the first surface of the brush assembly, and a main piece protruding from the base piece through a respective opening of the brush card mount to house a respective brush at least partially over the second surface of the brush assembly,
wherein the base piece is provided as a separate piece from the main piece,
wherein the base piece includes a flat portion, and the main piece includes a brush-holder portion shaped to contain three sides of the brush and two flat portions extending from the ends of the brush-holder portion in parallel to the base piece,
wherein the brush-holder portion of main piece is received through the opening of the brush card mount from the first surface and the flat portions of the main piece are sandwiched between the brush card mount and the base piece,
wherein the base piece further includes a plurality of legs projecting substantially perpendicularly therefrom, and
wherein the two flat portions of the main piece include slots corresponding to the legs of the base piece, and the brush card mount also includes slots corresponding to the slots of the main piece and the legs of the base piece.

11. The power tool of claim 10, wherein the side portions of the main piece are mounted on the base piece and the flat portion of the base piece surrounds a fourth side of the brush.

12. The power tool of claim 10, wherein the brush card mount includes recessed surfaces around the plurality of openings within the first surface of the brush assembly and the base pieces of the brush holders are disposed within the respective recessed surfaces.

* * * * *